US012745176B2

(12) United States Patent
Kim et al.

(10) Patent No.: US 12,745,176 B2
(45) Date of Patent: Sep. 22, 2026

(54) METHOD AND APPARATUS FOR SUPPORTING POWER SAVING ON BASIS OF XR TRAFFIC CHARACTERISTICS IN WIRELESS COMMUNICATION SYSTEM

(71) Applicant: LG ELECTRONICS INC., Seoul (KR)

(72) Inventors: Jaehyung Kim, Seoul (KR); Kijun Kim, Seoul (KR); Joonkui Ahn, Seoul (KR); Suckchel Yang, Seoul (KR); Seunggye Hwang, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 18/294,492

(22) PCT Filed: Aug. 8, 2022

(86) PCT No.: PCT/KR2022/011802
§ 371 (c)(1),
(2) Date: Feb. 1, 2024

(87) PCT Pub. No.: WO2023/014208
PCT Pub. Date: Feb. 9, 2023

(65) Prior Publication Data

US 2024/0357496 A1 Oct. 24, 2024

(30) Foreign Application Priority Data

Aug. 6, 2021 (KR) ........................ 10-2021-0104162

(51) Int. Cl.
*H04W 52/02* (2009.01)
*H04L 1/1812* (2023.01)

(52) U.S. Cl.
CPC ....... *H04W 52/0235* (2013.01); *H04L 1/1812* (2013.01)

(58) Field of Classification Search
CPC .............................. H04L 1/1812; H04L 12/50
(Continued)

(56) References Cited

U.S. PATENT DOCUMENTS 11,997,607 B2 * 5/2024 You .................. H04W 52/0235
2016/0080968 A1 3/2016 Jeong et al.
(Continued)

FOREIGN PATENT DOCUMENTS

KR 1020150000437 1/2015

OTHER PUBLICATIONS

PCT International Application No. PCT/KR2022/011802, International Search Report dated Dec. 19, 2022, 2 pages.
(Continued)

*Primary Examiner* — Dang T Ton
(74) *Attorney, Agent, or Firm* — LEE, HONG, DEGERMAN, KANG & WAIMEY

(57) ABSTRACT

A method performed by a base station (BS) in a wireless communication system is provided. The method comprises, based on a plurality of transport blocks (TBs) constituting a traffic being mapped to one frame, generating control information related to a power saving operation for a user equipment (UE) supporting extended reality (XR) based on delay related information of the traffic, and transmitting the control information to the UE on a per frame basis. The control information includes information on an order of the plurality of TBs within the frame, or information on a first TB within the frame, or information on a last TB within the frame.

16 Claims, 20 Drawing Sheets

(58) Field of Classification Search
USPC ................................ 370/329, 401, 402, 403
See application file for complete search history.

(56) References Cited

U.S. PATENT DOCUMENTS

| | | | | |
|---|---|---|---|---|
| 2019/0239160 | A1 | 8/2019 | Lee et al. | |
| 2021/0321480 | A1* | 10/2021 | Kwon | H04W 72/23 |

OTHER PUBLICATIONS

CATT, "Potential area of NR enhancement for the support of XR services," 3GPP TSG RAN WG1 #105-e, R1-2104501, May 2021, 4 pages.
Nokia et al., "Enhancements for better XR support over NR," 3GPP TSG RAN WG1 #105-e, R1-2104558, May 2021, 6 pages.
Vivo, "FL summary#3 of DCI-based power saving adaptation," 3GPP TSG RAN WG1 #105-e, R1-2106243, May 2021, 85 pages.
European Patent Office Application Serial No. 22853583.7, Search Report dated Apr. 11, 2025, 8 pages.

* cited by examiner

【FIG. 1】
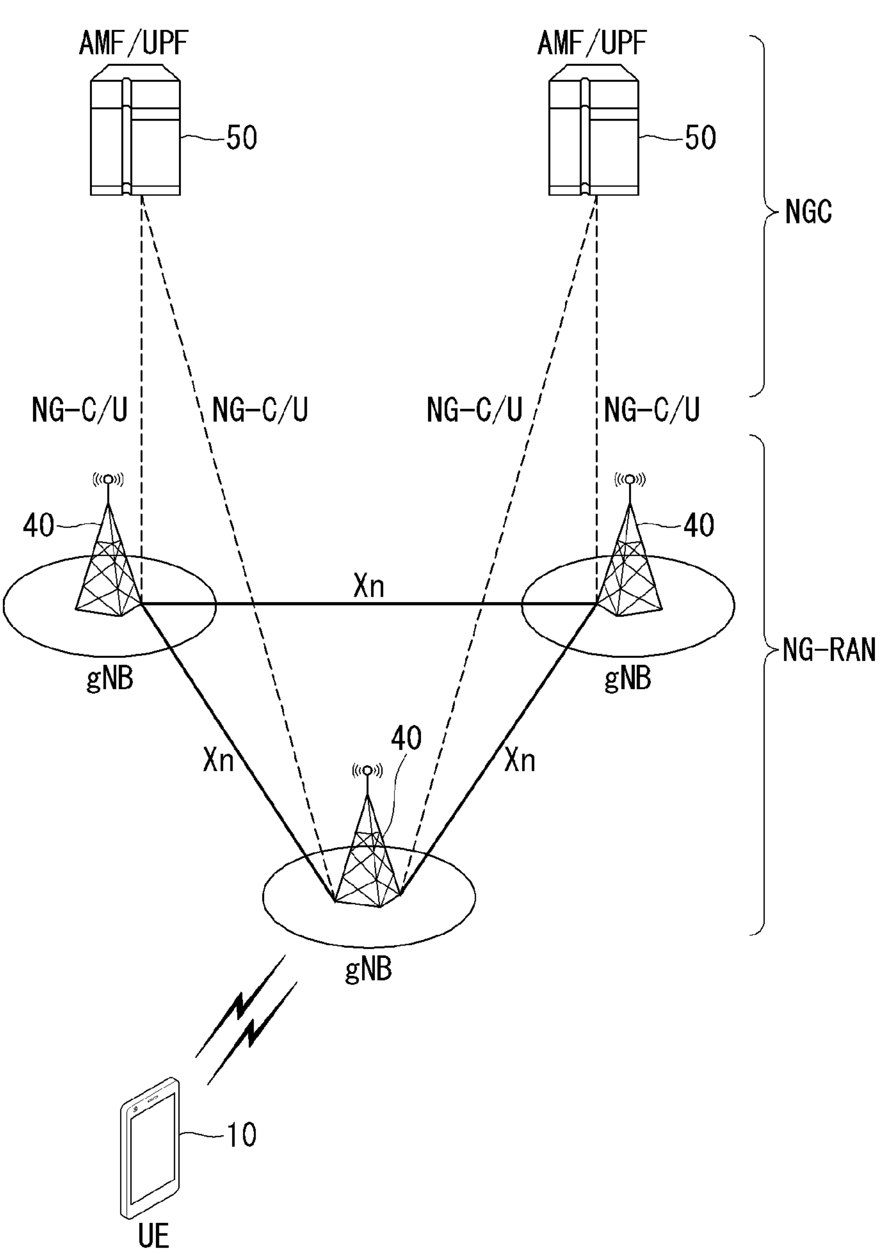

【FIG. 2】
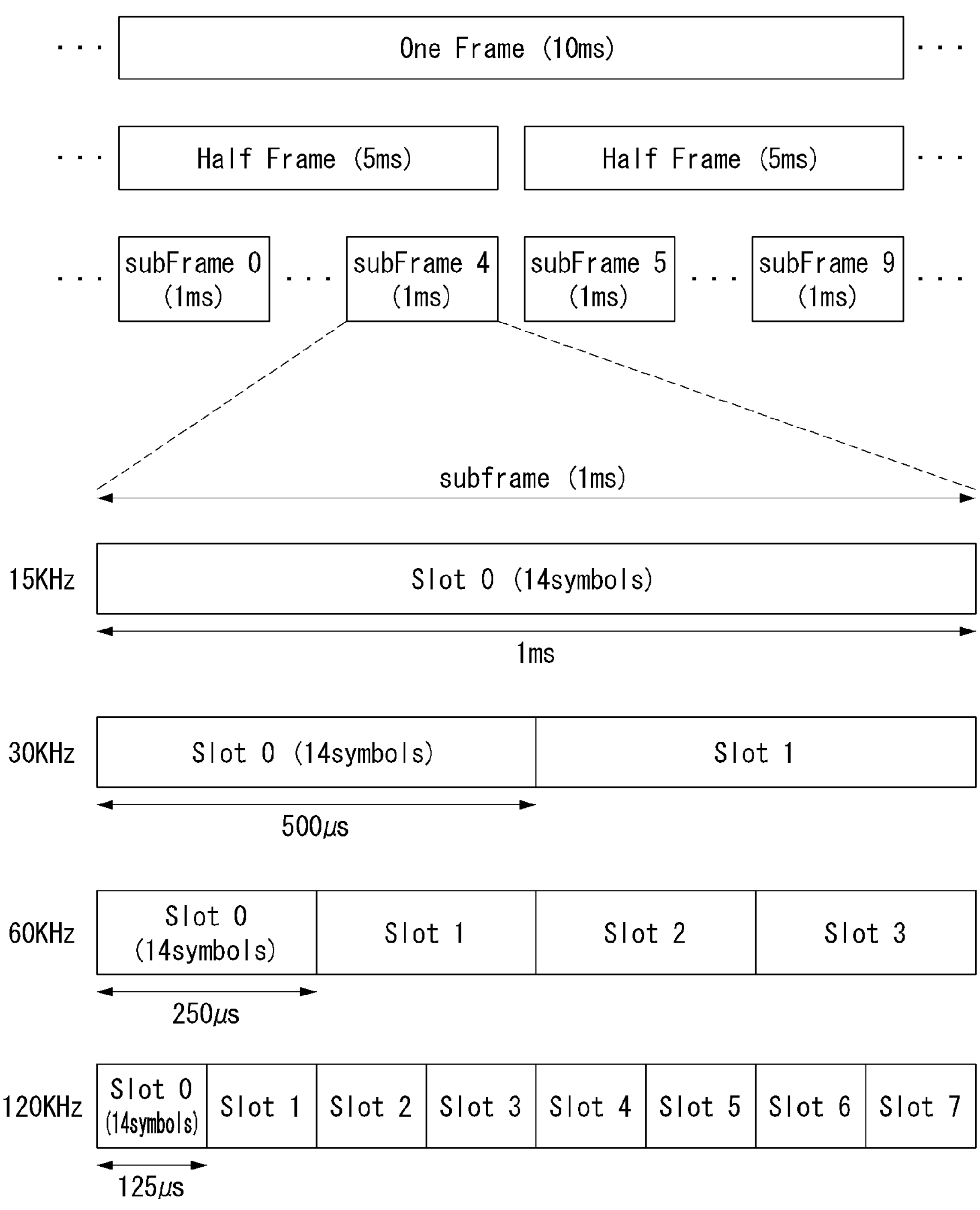

【FIG. 3】
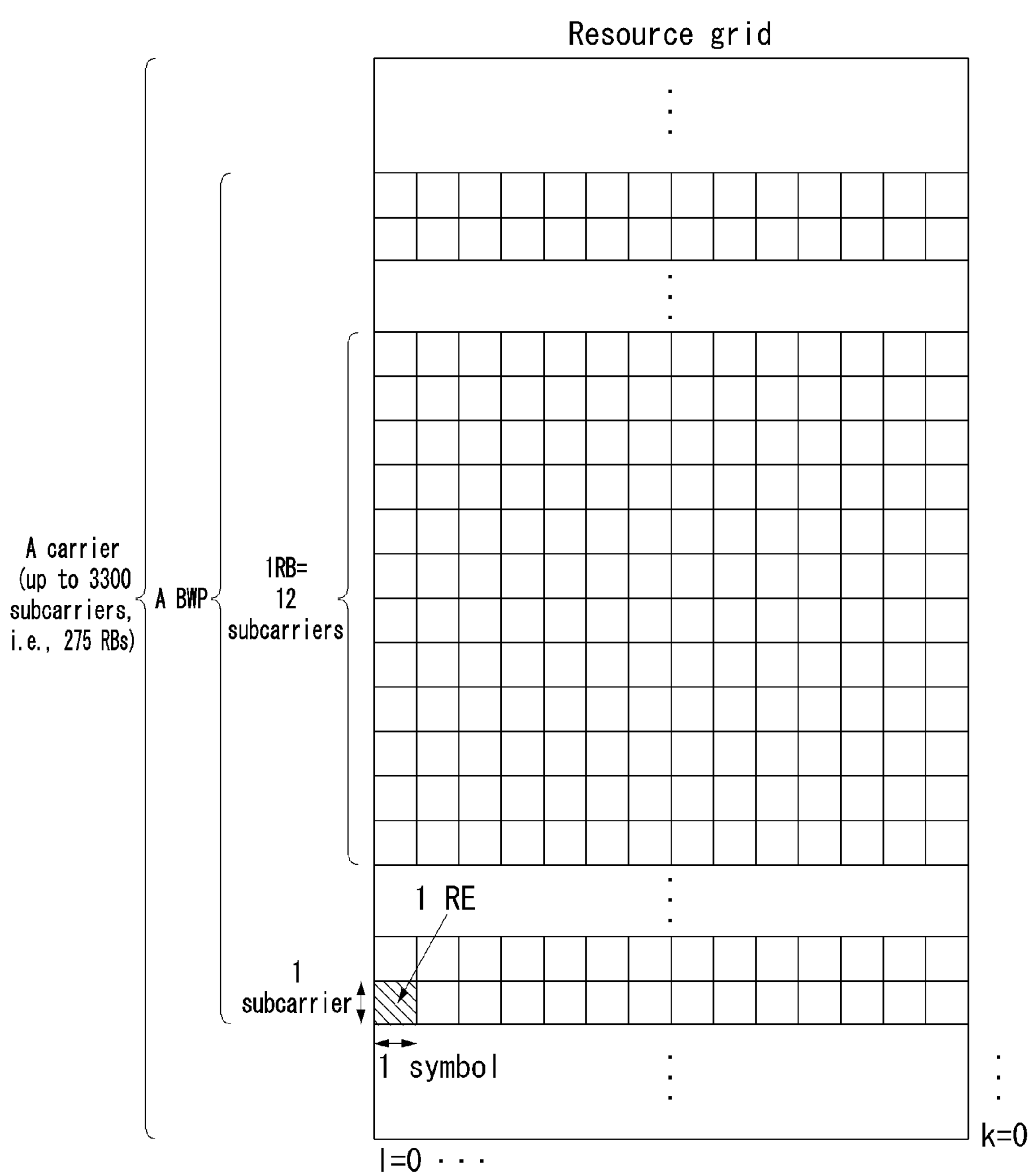

【FIG. 4】
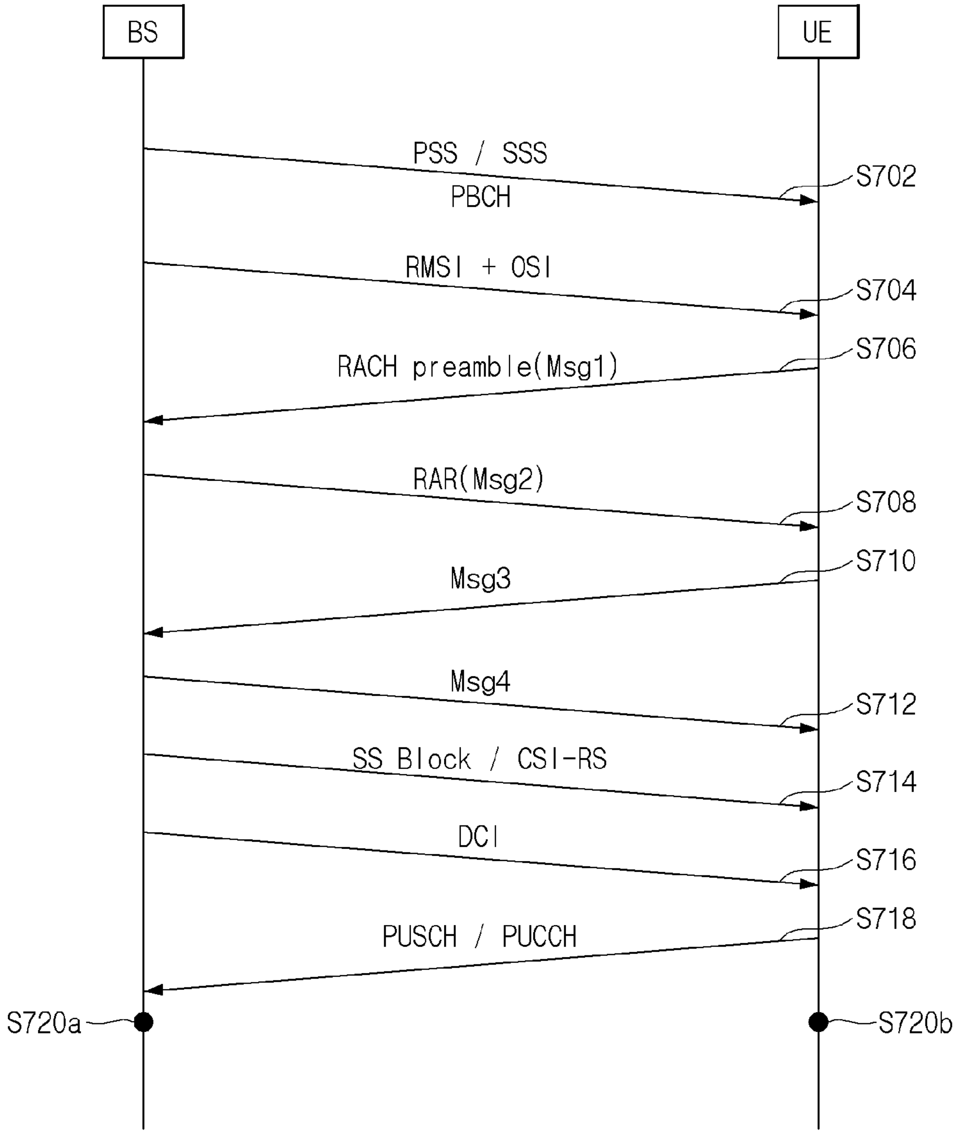
【FIG. 5】
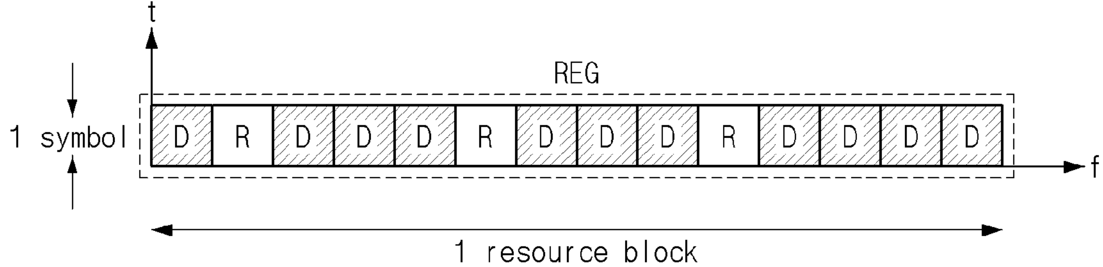

【FIG. 6】
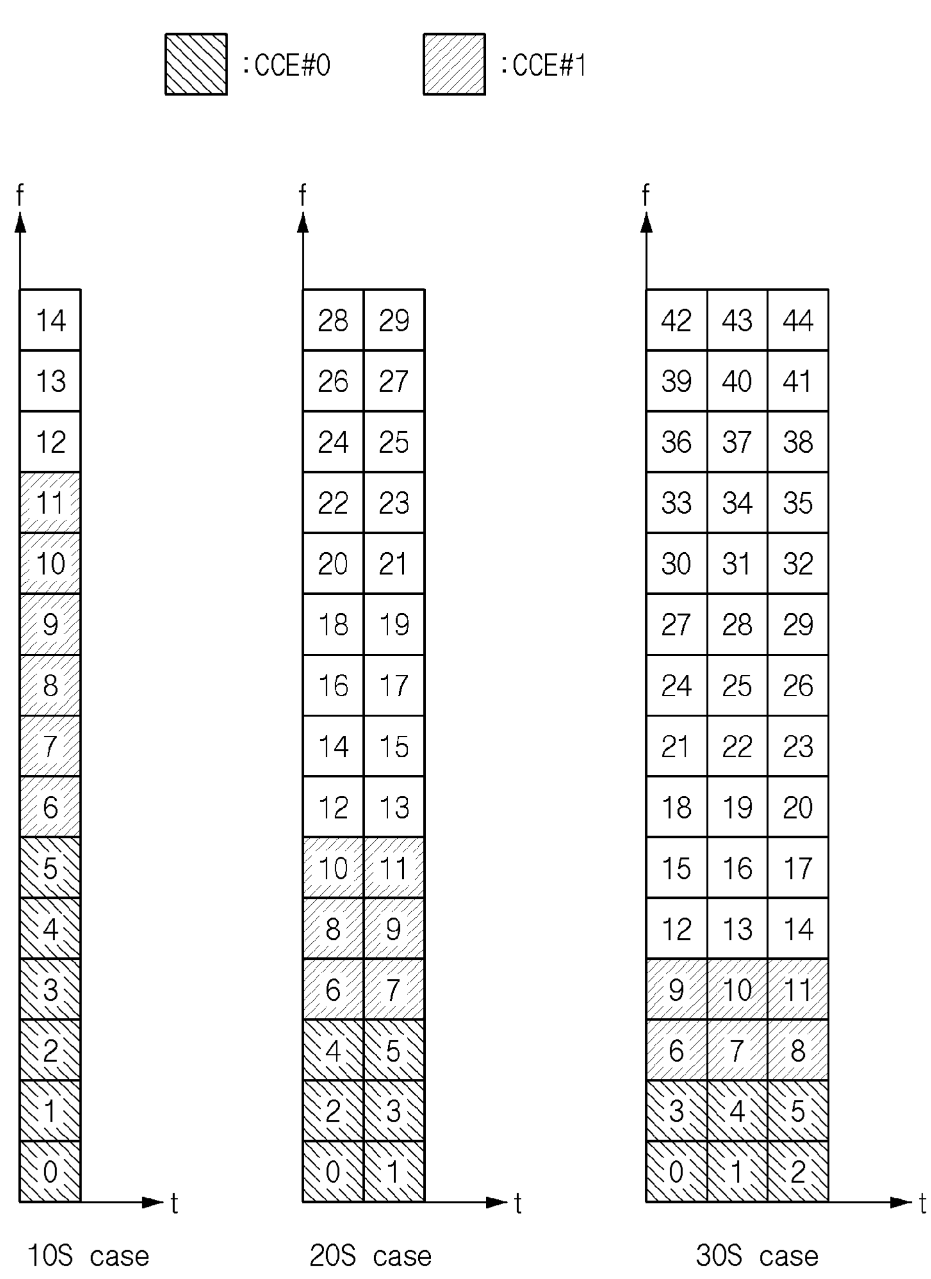

【FIG. 7】
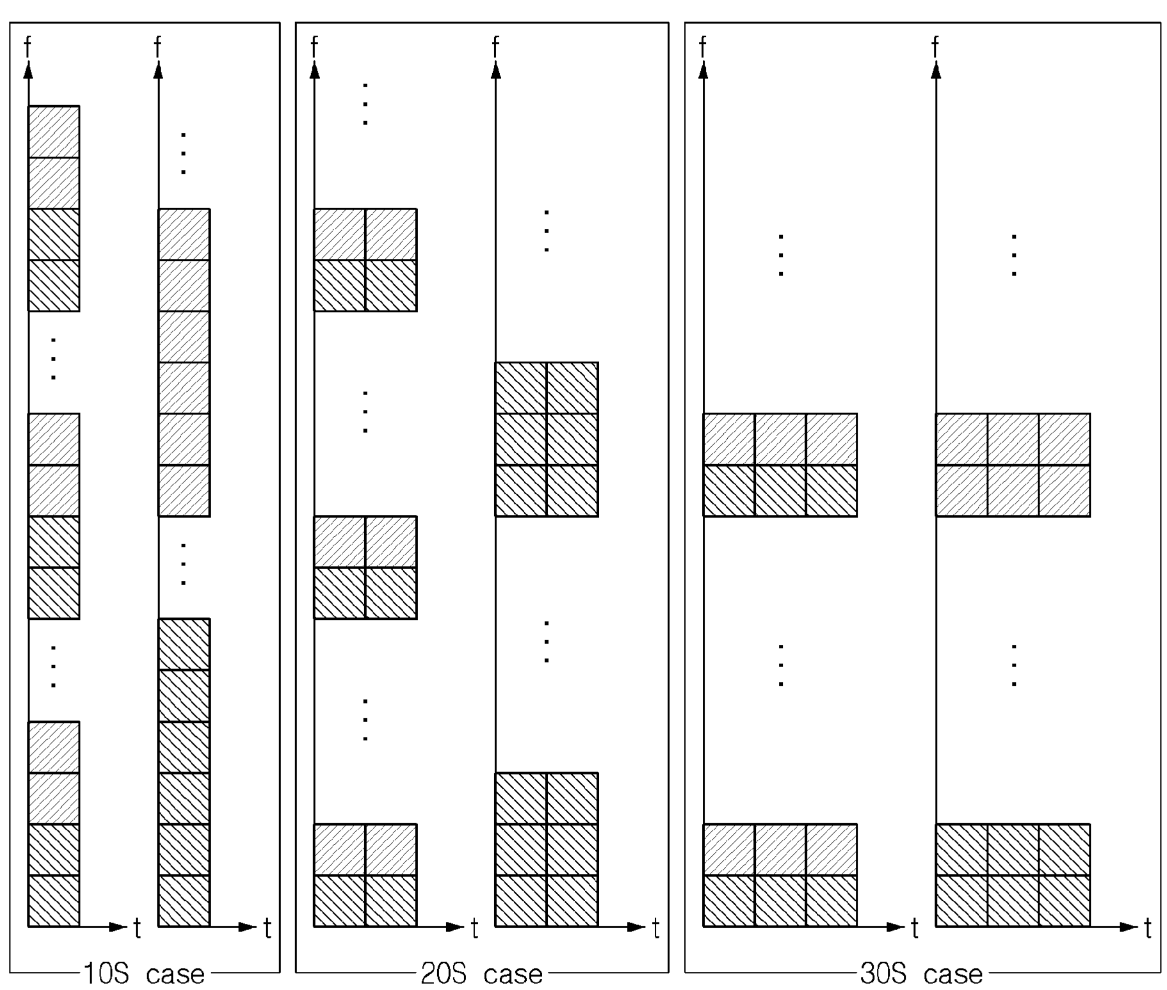

【FIG. 8】
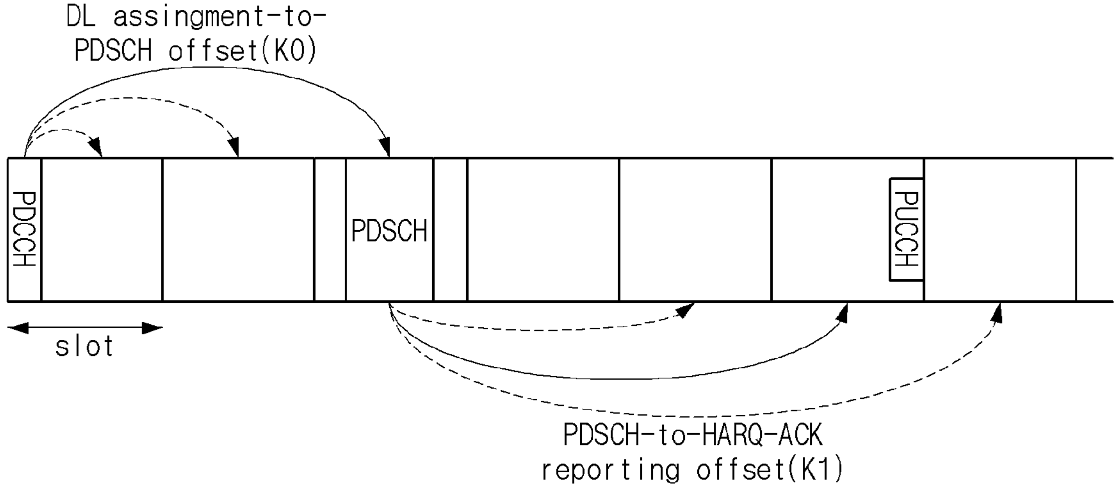
【FIG. 9】
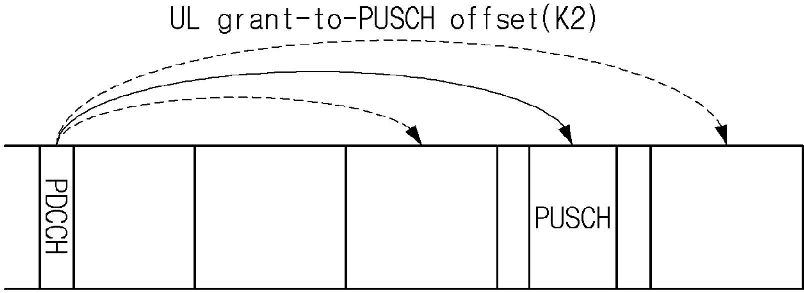

【FIG. 10】
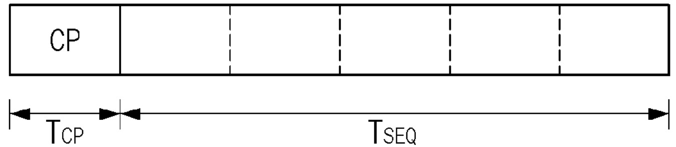
(a) Preamble symbol group
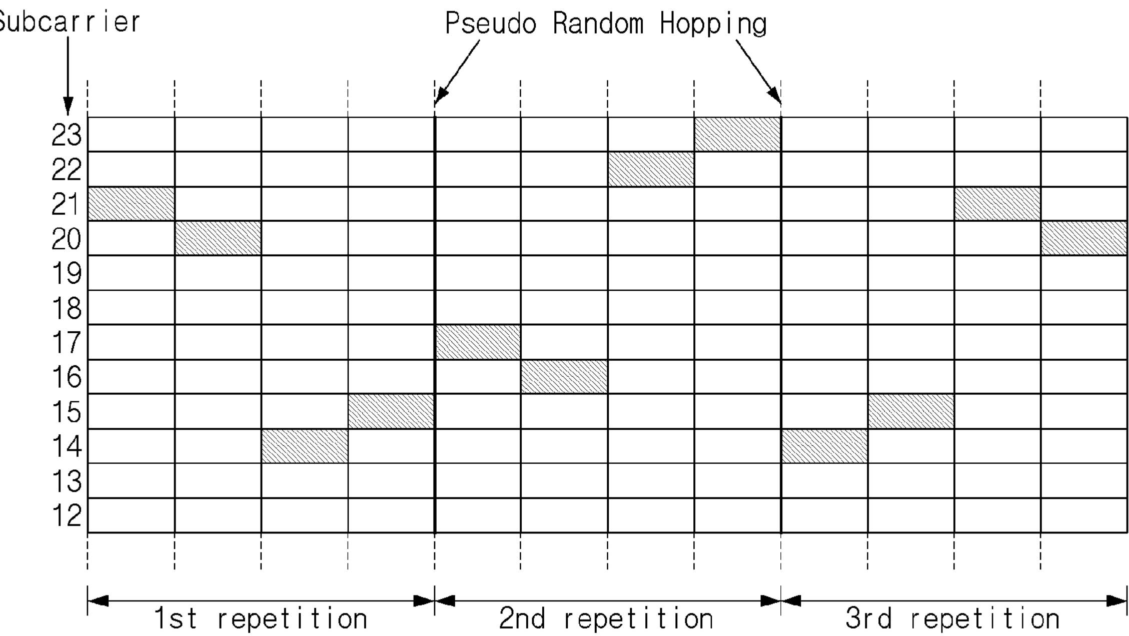
(b) Preamble transmission 【FIG. 11】
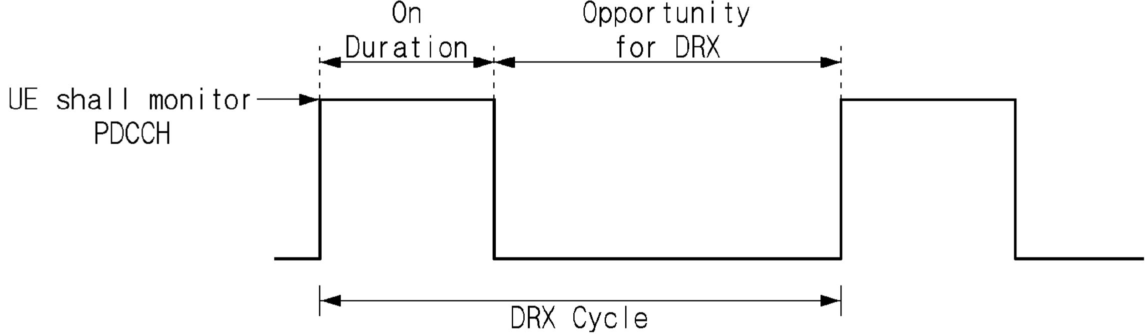
【FIG. 12】
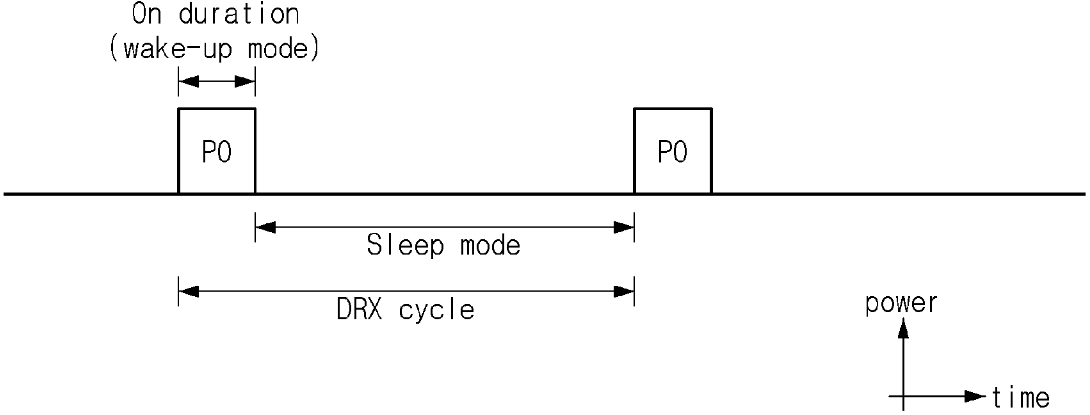

【FIG. 13】
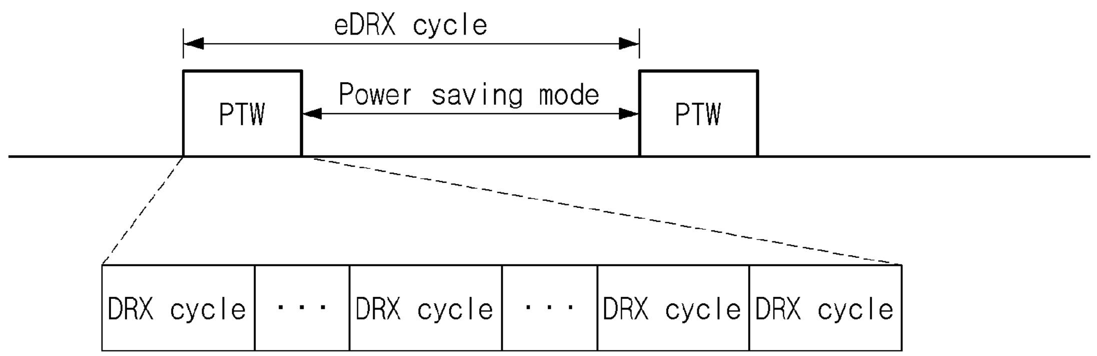
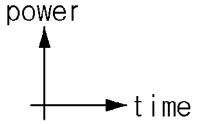
【FIG. 14】
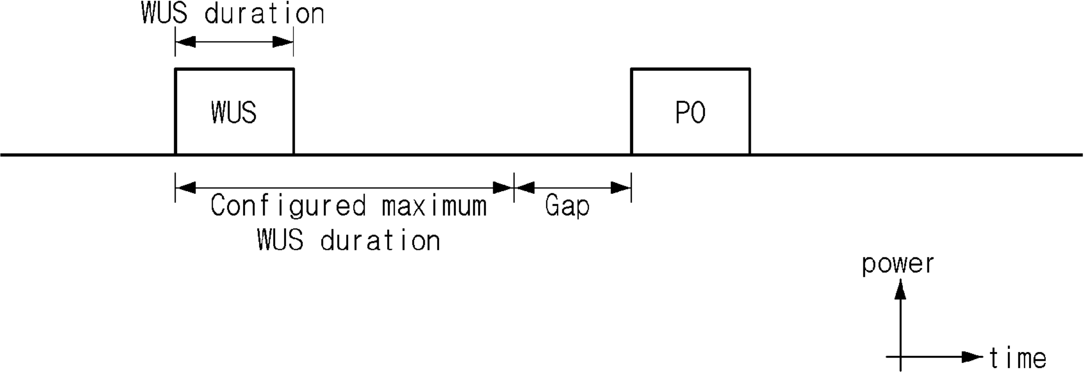

【FIG. 15】
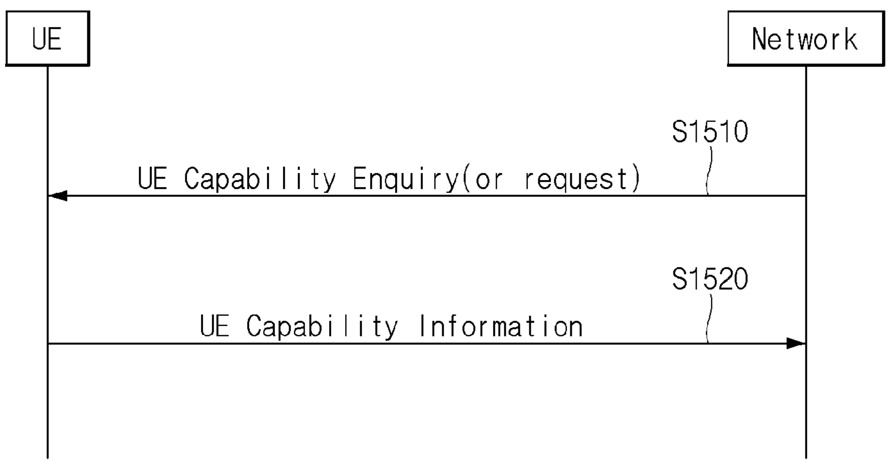
【FIG. 16】
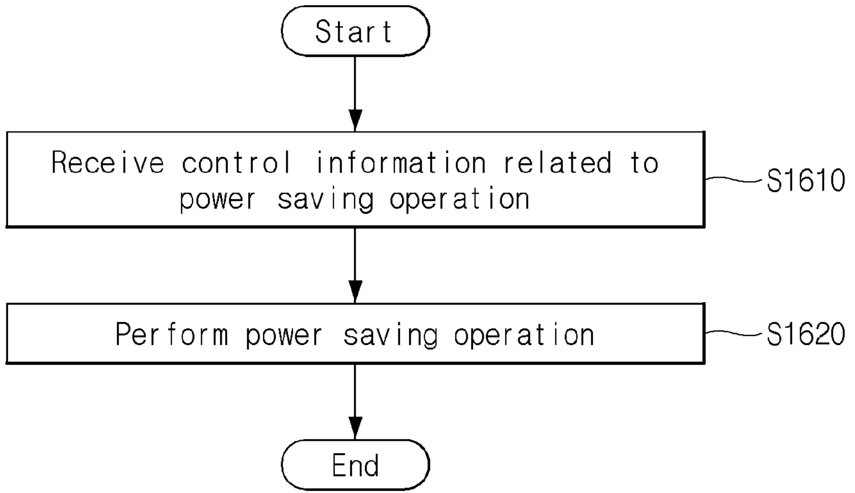

【FIG. 17】
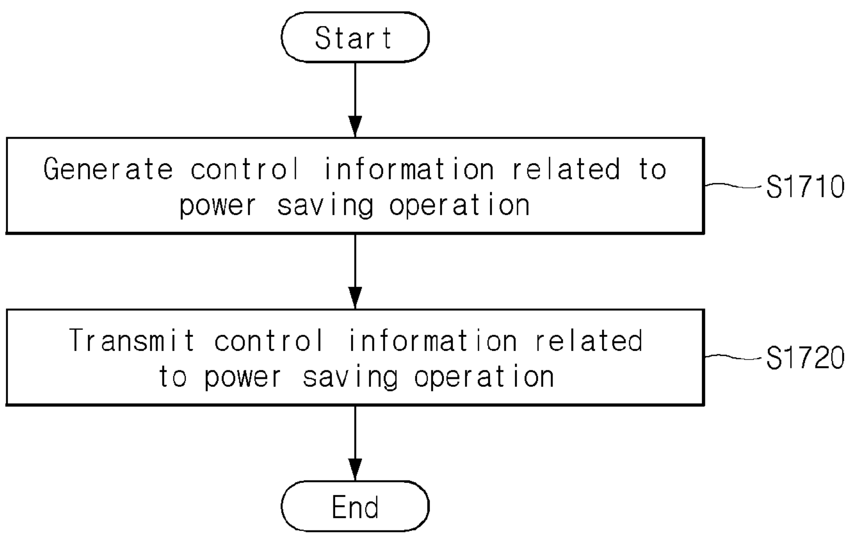
【FIG. 18】
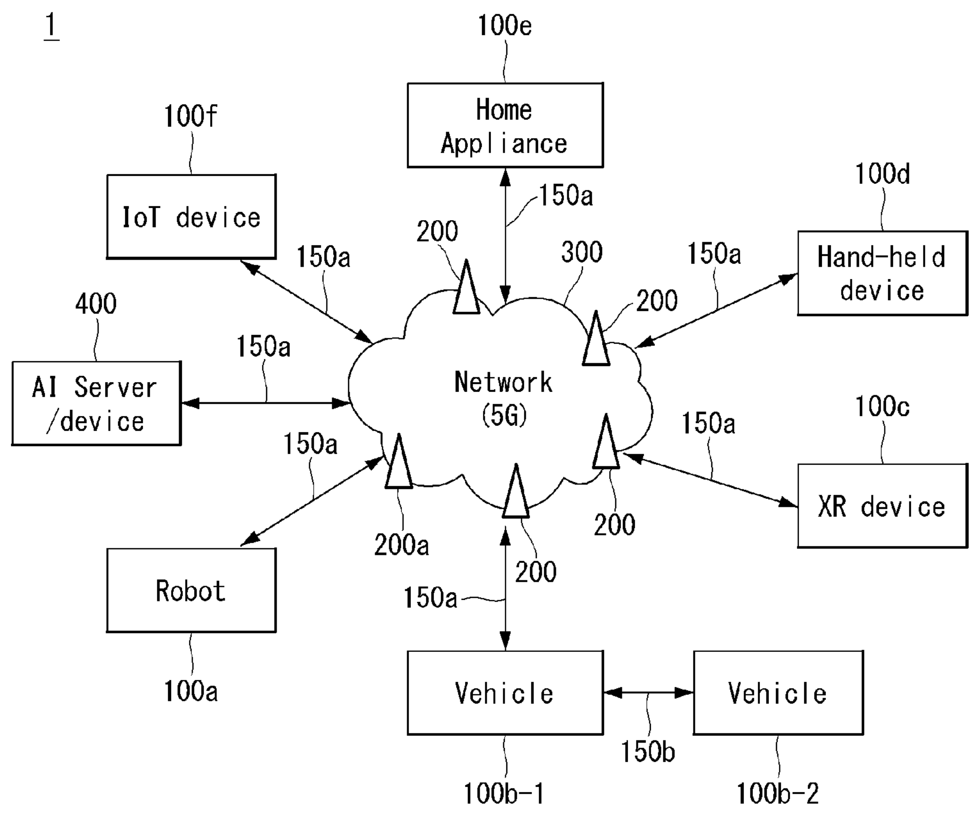

【FIG. 19】
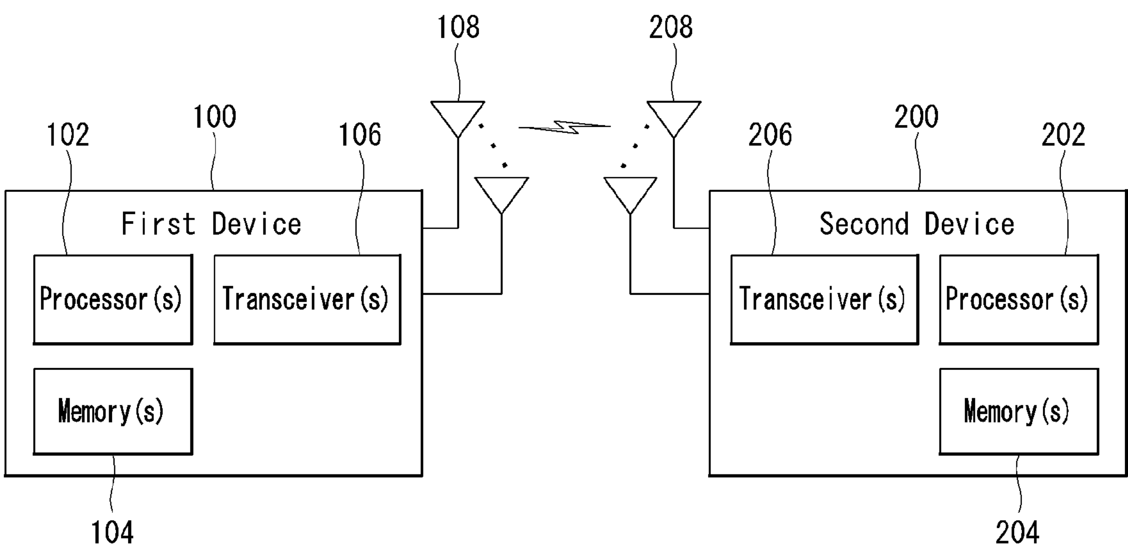
【FIG. 20】
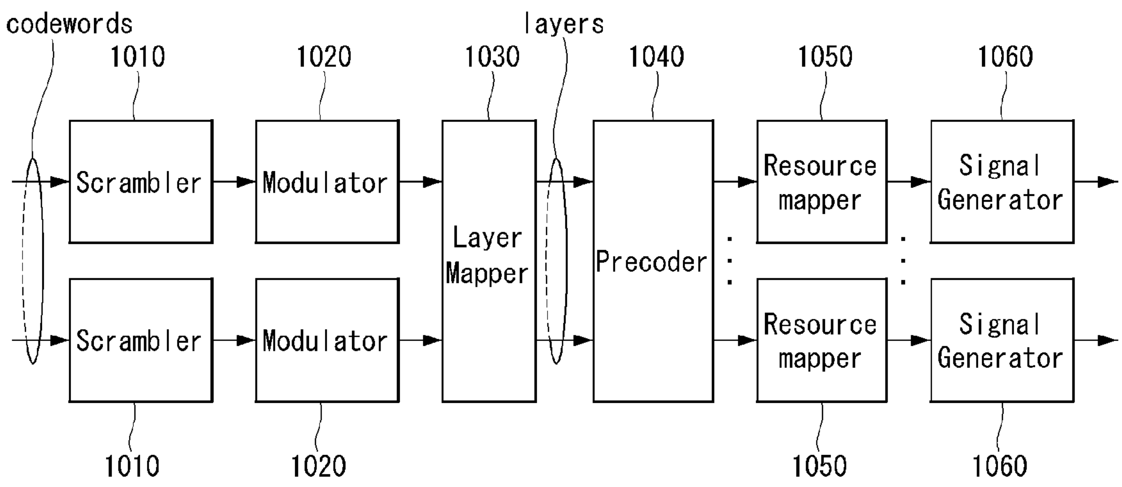

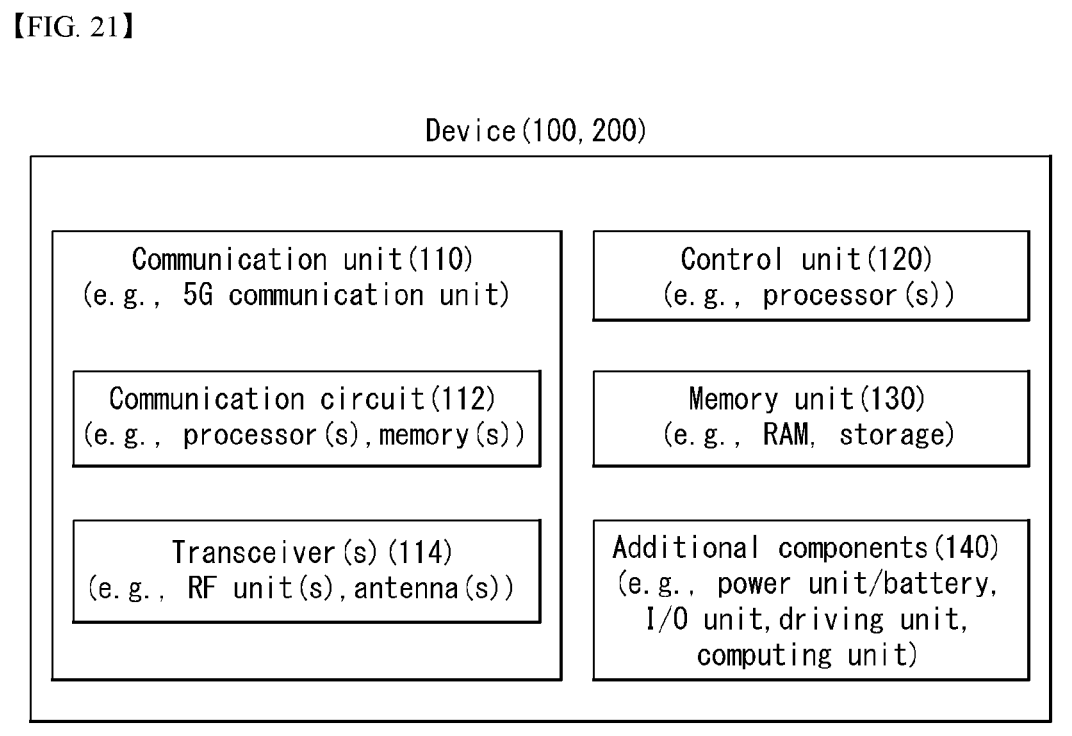

【FIG. 21】

Device(100, 200)

Communication unit(110)
(e.g., 5G communication unit)

Communication circuit(112)
(e.g., processor(s), memory(s))

Transceiver(s)(114)
(e.g., RF unit(s), antenna(s))

Control unit(120)
(e.g., processor(s))

Memory unit(130)
(e.g., RAM, storage)

Additional components(140)
(e.g., power unit/battery, I/O unit, driving unit, computing unit)

【FIG. 22】
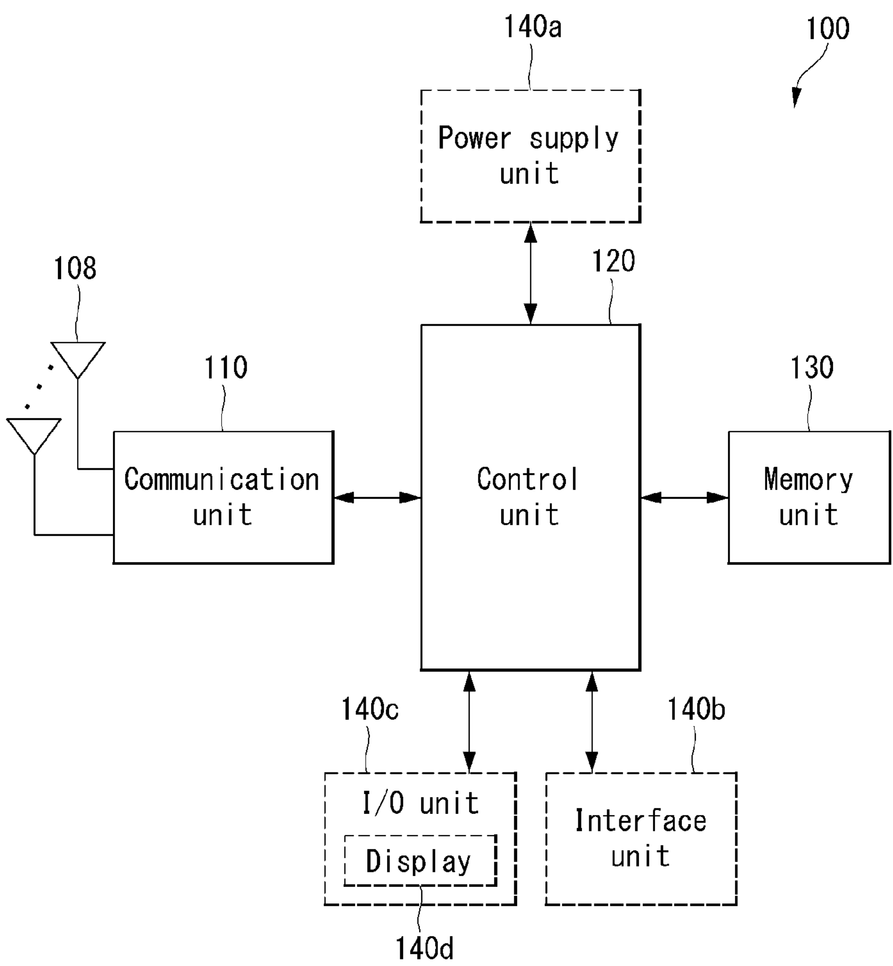

【FIG. 23】
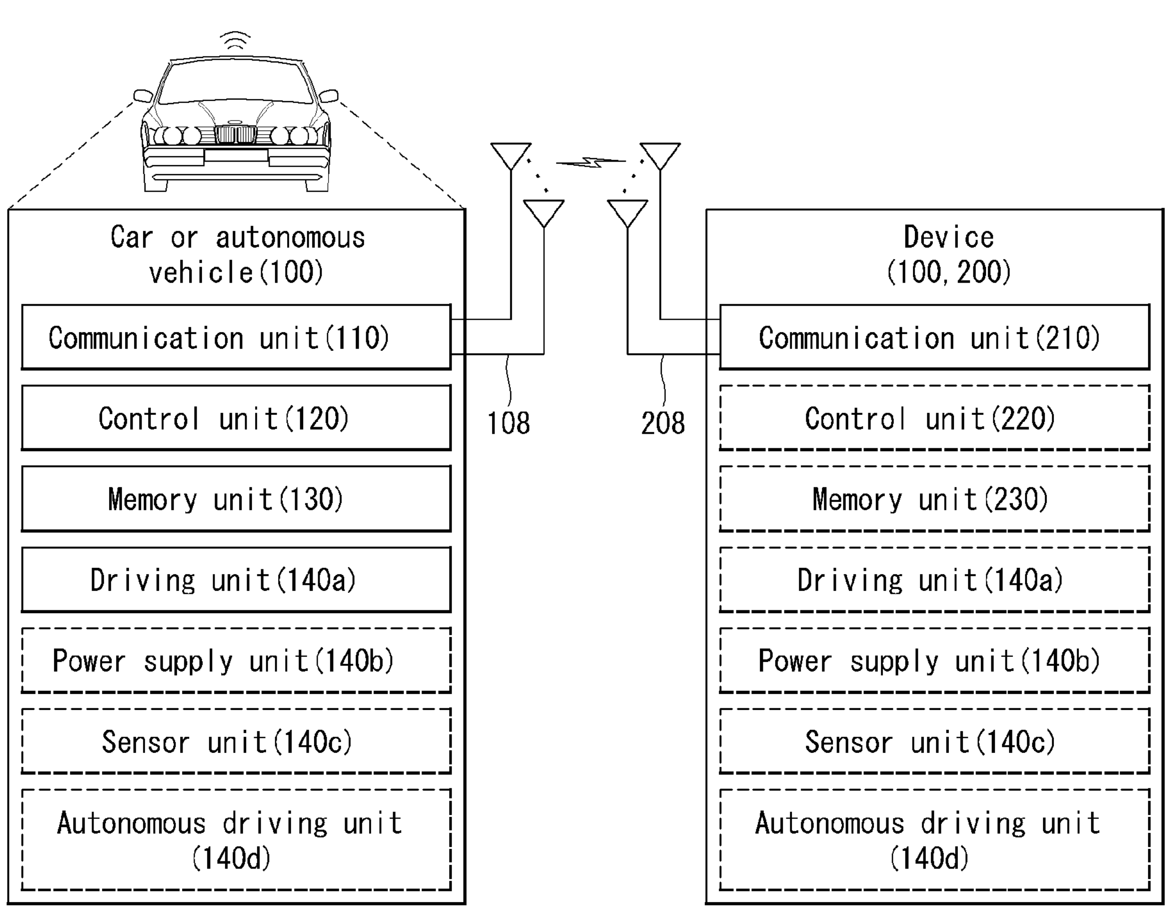

【FIG. 24】
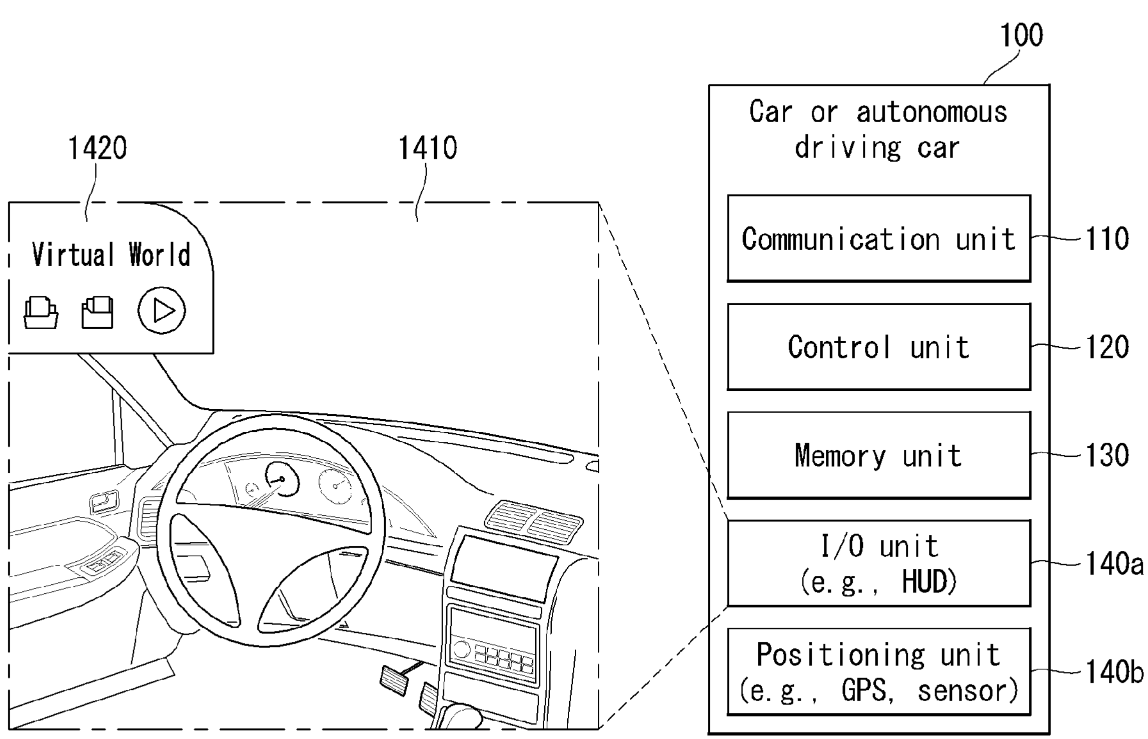

【FIG. 25】
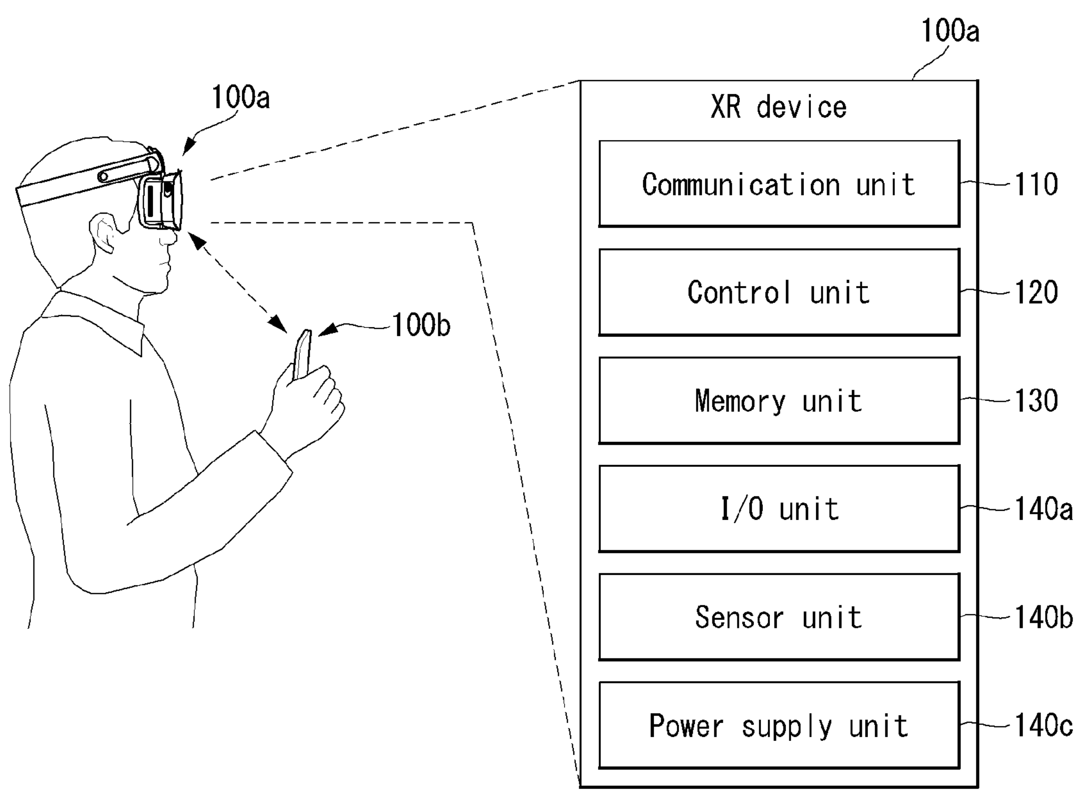

【FIG. 26】
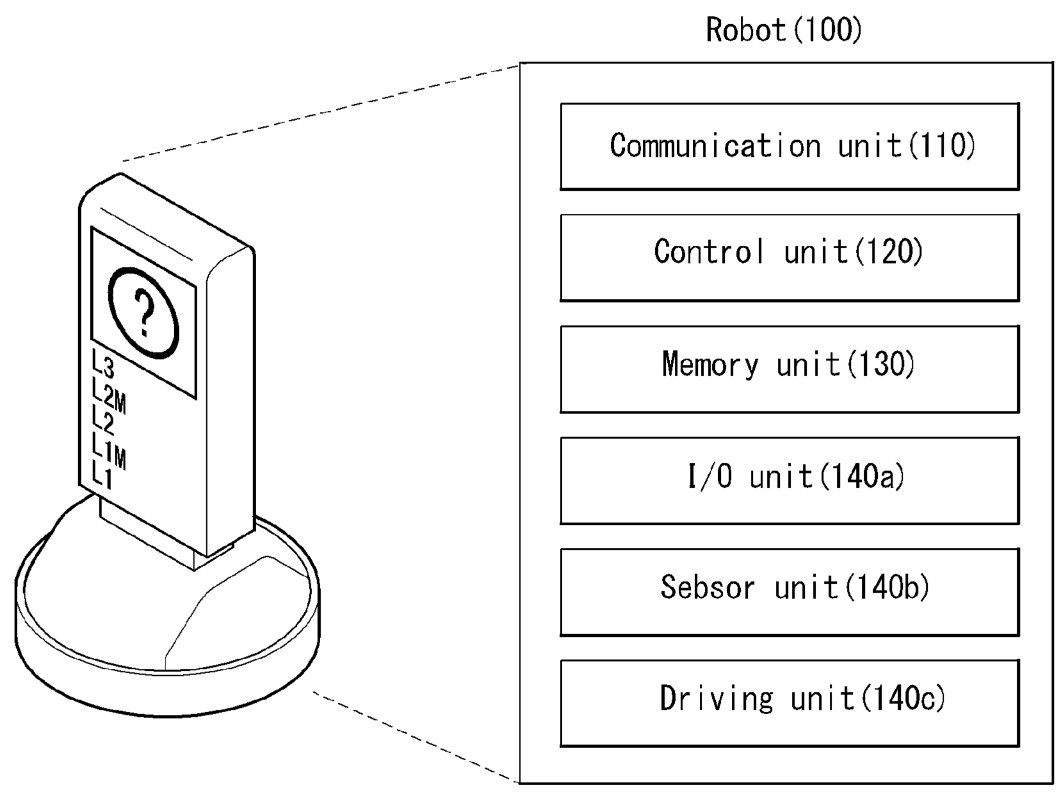

【FIG. 27】
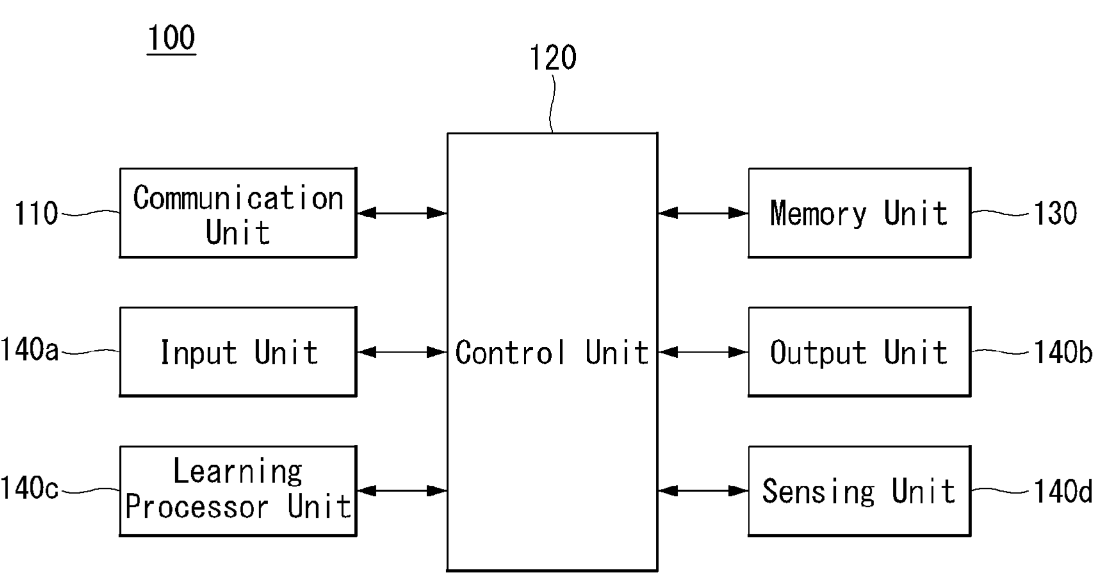

METHOD AND APPARATUS FOR SUPPORTING POWER SAVING ON BASIS OF XR TRAFFIC CHARACTERISTICS IN WIRELESS COMMUNICATION SYSTEM

CROSS-REFERENCE TO RELATED APPLICATION(S)

This application is the National Stage filing under 35 U.S.C. 371 of International Application No. PCT/KR2022/011802, filed on Aug. 8, 2022, which claims the benefit of earlier filing date and right of priority to Korean Application No. 10-2021-0104162, filed on Aug. 6, 2021, the contents of which are all incorporated by reference herein in their entirety.

TECHNICAL FIELD

The present disclosure relates to a wireless communication system, and more particularly to a method and device of supporting power saving based on XR traffic characteristics in a wireless communication system.

BACKGROUND ART

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

As more and more communication devices require larger communication capacity, there is a need for improved mobile broadband communication compared to the existing radio access technology (RAT). Hence, communication systems considering services or user equipments (UEs) sensitive to reliability and latency are being discussed, and the next generation radio access technology considering enhanced mobile broadband communication, massive machine type communication (MTC), ultra-reliable and low latency communication (URLLC), etc. may be called new radio access technology (RAT) or new radio (NR).

Mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for the next-generation mobile communication systems need to able to support the accommodation of explosive data traffic, a dramatic increase in data rate per user, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

Extended reality (XR) is used as a general term for virtual reality (VR), augmented reality (AR), mixed reality (MR), etc., and has been recently considered an important media application for 5G in the industry. In the present disclosure, XR service or XR application is also referred to as XR. In order to support the XR in a wireless communication system, it is necessary to understand and meet XR requirements. The XR requirements have a feature of simultaneously requiring low latency, high reliability, and high data rate, unlike other 3GPP use cases. Reflecting this feature, the XR is also referred to as low-latency eMBB or high data rate URLLC use case.

In order to successfully support the XR in the wireless communication system, improvements may be required in terms of cell capacity (the number of XR users that can be simultaneously supported per cell), terminal power saving, mobility, coverage, or the like. Among these, improvements in the cell capacity and the terminal power saving are known to be the most urgent. This is because the cell capacity may be a level for about a few people when currently assuming a typical XR scenario, and power supply may not be smooth compared to the power required when considering various form factors (e.g., AR glass, HMD, etc.) of an XR terminal.

An object of embodiments of the present disclosure is to provide a solution to problems of insufficient cell capacity and terminal power consumption that may occur when intending to support XR in a wireless communication system. The expected effect of the present disclosure is to smoothly support the XR in the wireless communication system in terms of number of users and terminal battery life.

In order to solve the above-mentioned problems, an object of embodiments of the present disclosure is to provide a method of determining non-preferred resources that are effective as inter-UE coordination information.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

According to various embodiments of the present disclosure, there is provided a method performed by a base station (BS) in a wireless communication system. The method comprises, based on a plurality of transport blocks (TBs) constituting a traffic being mapped to one frame, generating control information related to a power saving operation for a user equipment (UE) supporting extended reality (XR) based on delay related information of the traffic, and transmitting the control information to the UE on a per frame basis. The control information includes information on an order of the plurality of TBs within the frame, or information on a first TB within the frame, or information on a last TB within the frame.

According to various embodiments of the present disclosure, the power saving operation within the control information may be configured per frame or per hybrid automatic repeat request (HARQ) process constituting the frame.

According to various embodiments of the present disclosure, the control information may further include information for a XR-retransmission (reTx) timer of the UE. Based on the XR-reTx timer expiring, the power saving operation may include an operation of stopping a monitoring of a physical downlink control channel (PDCCH) by the UE.

According to various embodiments of the present disclosure, the XR-reTx timer may start after the BS receives, from the UE, an acknowledgement (ACK) response or a negative acknowledgement (NACK) response to a physical downlink shared channel (PDSCH).

According to various embodiments of the present disclosure, the XR-reTx timer may start at a first symbol after the BS receives, from the UE, the ACK response or the NACK response to the PDSCH.

According to various embodiments of the present disclosure, the XR-reTx timer may start after the control information is transmitted to the UE from the BS.

According to various embodiments of the present disclosure, based on the XR-reTx timer for the first TB within the frame or the last TB within the frame expiring, the power saving operation may include the operation of stopping the monitoring of the PDCCH by the UE.

According to various embodiments of the present disclosure, the power saving operation may include an operation by a HARQ process related to a TB scheduled by downlink control information (DCI) including the control information of a frame-level.

According to various embodiments of the present disclosure, based on the same control information of the frame-level being transmitted by the BS to the UE multiple times by multiple DCIs, the power saving operation may include an operation by the HARQ process related to a TB scheduled by a last transmitted DCI.

According to various embodiments of the present disclosure, there is provided a base station (BS) in a wireless communication system. The BS comprises a transceiver and at least one processor, and the at least one processor may be configured to perform an operation method of the BS according to various embodiments of the present disclosure.

According to various embodiments of the present disclosure, there is provided a device controlling a base station (BS) in a wireless communication system. The device comprises at least one processor and at least one memory operably connected to the at least one processor. The at least one memory may be configured to store instructions performing an operation method of the BS according to various embodiments of the present disclosure based on being executed by the at least one processor.

According to various embodiments of the present disclosure, there are provided one or more non-transitory computer readable mediums storing one or more instructions. The one or more instructions may be configured to perform operations based on being executed by one or more processors, and the operations may comprise an operation method of a base station according to various embodiments of the present disclosure.

Advantageous Effects

Embodiments of the present disclosure can solve problems of insufficient cell capacity and terminal power consumption that may occur when intending to support XR in a wireless communication system.

Embodiments of the present disclosure can smoothly support XR in a wireless communication system in terms of number of users and terminal battery life.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates a structure of a wireless communication system according to an embodiment of the present disclosure.

FIG. 2 illustrates a structure of a radio frame of a wireless communication system according to an embodiment of the present disclosure.

FIG. 3 illustrates a slot structure of a frame of a wireless communication system according to an embodiment of the present disclosure.

FIG. 4 illustrates initial network access and subsequent communication process of a wireless communication system according to an embodiment of the present disclosure.

FIG. 5 illustrates an example of one REG structure in a wireless communication system according to an embodiment of the present disclosure.

FIG. 6 illustrates an example of a non-interleaved CCE-REG mapping type in a wireless communication system according to an embodiment of the present disclosure.

FIG. 7 illustrates an example of an interleaved CCE-REG mapping type in a wireless communication system according to an embodiment of the present disclosure.

FIG. 8 illustrates an example of a HARQ-ACK procedure for DL data in a wireless communication system according to an embodiment of the present disclosure.

FIG. 9 illustrates an example of a PUSCH transmission procedure in a wireless communication system according to an embodiment of the present disclosure.

FIG. 10 illustrates an example of a preamble transmission procedure in NB-IoT RACH in a wireless communication system according to an embodiment of the present disclosure.

FIG. 11 illustrates an example of a discontinuous reception (DRX) cycle for discontinuous reception of PDCCH in a wireless communication system according to an embodiment of the present disclosure.

FIG. 12 illustrates an example of a DRX cycle for paging in a wireless communication system according to an embodiment of the present disclosure.

FIG. 13 illustrates an example of an extended DRX (eDRX) cycle in a wireless communication system according to an embodiment of the present disclosure.

FIG. 14 illustrates an example of a timing relationship of WUS and PO in a wireless communication system according to an embodiment of the present disclosure.

FIG. 15 illustrates an example of a process for a report procedure of (T-)XR related capability information according to various embodiments of the present disclosure.

FIG. 16 illustrates an operation process of a UE in a wireless communication system according to an embodiment of the present disclosure.

FIG. 17 illustrates an operation method of a base station in a wireless communication system according to an embodiment of the present disclosure.

FIG. 18 illustrates an example of a communication system applied to various embodiments of the present disclosure.

FIG. 19 illustrates an example of a wireless device applied to various embodiments of the present disclosure.

FIG. 20 illustrates an example of a signal processing circuit for a transmission signal applied to various embodiments of the present disclosure.

FIG. 21 illustrates an example of a wireless device applied to various embodiments of the present disclosure.

FIG. 22 illustrates an example of a mobile device applied to various embodiments of the present disclosure.

FIG. 23 illustrates an example of a vehicle or an autonomous vehicle applied to various embodiments of the present disclosure.

FIG. 24 illustrates an example of a vehicle applied to various embodiments of the present disclosure.

FIG. 25 illustrates an example of a XR device applied to various embodiments of the present disclosure.

FIG. 26 illustrates an example of a robot applied to various embodiments of the present disclosure.

FIG. 27 illustrates an example of an AI device applied to various embodiments of the present disclosure.

MODE FOR INVENTION

In the present disclosure, "A or B" may mean "only A", "only B" or "both A and B." In other words, in the present disclosure, "A or B" may be interpreted as "A and/or B". For example, in the present disclosure, "A, B or C" may mean "only A", "only B", "only C", or "any combination of A, B and C".

A slash (/) or comma used in the present disclosure may mean "and/or". For example, "A/B" may mean "A and/or B". Hence, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression of "at least one of A or B" or "at least one of A and/or B" may be interpreted in the same meaning as "at least one of A and B".

Further, in the present disclosure, "at least one of A, B, and C" may mean "only A", "only B", "only C" or "any combination of A, B and C." In addition, "at least one of A, B or C" or "at least one of A, B and/or C" may mean "at least one of A, B, and C."

Further, parentheses used in the present disclosure may mean "for example." Specifically, when "control information (PDCCH)" is described, "PDCCH" may be proposed as an example of "control information." In other words, "control information" in the present disclosure is not limited to "PDCCH," and "PDDCH" may be proposed as an example of "control information." In addition, even when "control information (i.e., PDCCH)" is described, "PDCCH" may be proposed as an example of "control information."

In the following description, the expression of 'when, if, in case of' may be replaced with 'based on'.

Technical features described individually in one drawing in the present disclosure may be implemented individually or simultaneously.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

For terms and techniques not specifically described among terms and techniques used in the present disclosure, reference may be made to a wireless communication standard document published before the present disclosure is filed. For example, the following document may be referred to it.

3GPP LTE

- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.314: Layer 2-Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol
- 3GPP TS 38.211: Physical channels and modulation 3GPP NR (e.g., 5G)

- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: Overall description
- 3GPP TS 38.304: User Equipment (UE) procedures in idle mode and in RRC inactive state
- 3GPP TS 38.321: Medium Access Control (MAC) protocol
- 3GPP TS 38.322: Radio Link Control (RLC) protocol
- 3GPP TS 38.323: Packet Data Convergence Protocol (PDCP)
- 3GPP TS 38.331: Radio Resource Control (RRC) protocol
- 3GPP TS 37.324: Service Data Adaptation Protocol (SDAP)
- 3GPP TS 37.340: Multi-connectivity; Overall description The symbols/abbreviations/terms used in the present disclosure are as follows.

- SS: Search Space
- CSS: Common Search Space
- USS: UE-specific Search Space
- PDCCH: Physical Downlink Control Channel PDSCH: Physical Downlink Shared Channel;
PUCCH: Physical Uplink Control Channel;
PUSCH: Physical Uplink Shared Channel;
DCI: Downlink Control Information
UCI: Uplink Control Information
PO: Paging Occasion
MO: Monitoring Occasion
IE: Information Element
RE: Resource Element
RS: Reference Signal
TRS: Tracking Reference Signal
CSI-RS: Channel-State Information Reference Signal
DRX: Discontinuous Reception
C-DRX: Connected mode DRX
DTX: Discontinuous Transmission
RRC: Radio Resource Control
UE: User Equipment
SSB: Synchronization Signal Block
SI: System Information
MIB: Master Information Block
SIB: System Information Block
SIB1: SIB1 for NR devices=RMSI (Remaining Minimum System Information). It broadcasts information, etc. necessary for cell access of an NR UE.
FR1: Frequency domain with frequency range 1.410 MHz to 7.125 GHz.
FR2: Frequency domain with frequency range 2.24.25 GHz to 52.6 GMHz. (mmWave area)
BW: Bandwidth
BWP: Bandwidth Part
RNTI: Radio Network Temporary Identifier
CRC: Cyclic Redundancy Check
CORESET (COntrol REsource SET): time/frequency resource in which an NR UE tries candidate PDCCH decoding
CORESET #0: CORESET for Type0-PDCCH CSS set for NR devices (configured in MIB)
Type0-PDCCH CSS set: a search space set in which an NR UE monitors a set of PDCCH candidates for a DCI format with CRC scrambled by a SI-RNTI
MO: PDCCH Monitoring Occasion for Type0-PDCCH CSS set
Cell defining SSB (CD-SSB): SSB including RMSI scheduling information among NR SSBs
Non-cell defining SSB (non-CD-SSB): SSB that has been deployed on NR sync raster, but does not include RMSI scheduling information of a corresponding cell for measurement. But, the SSB may include information informing a location of cell defining SSB.
SCS: subcarrier spacing
SI-RNTI: System Information Radio-Network Temporary Identifier
Camp on: "Camp on" is the UE state in which the UE stays on a cell and is ready to initiate a potential dedicated service or to receive an ongoing broadcast service.
TB: Transport Block
FDRA: Frequency Domain Resource Allocation
TDRA: Time Domain Resource Allocation
XR: extended Reality
VR: Virtual Reality
AR: Augmented Reality
MR: Mixed Reality
CG: Cloud Gaming
PDB: Packet Delay Budget
DL: downlink
UL: uplink
(re) Tx: (re) transmission
HMD: Head Mounted Display
MAC: Medium Access Control
MAC CE: MAC Control Elements
LC: Logical Channel
LCID: Logical Channel Identity FIG. 1 shows a structure of a wireless communication system, based on an embodiment of the present disclosure.

Referring to FIG. 1 a Next Generation-Radio Access Network (NG-RAN) may include a next generation-Node B (gNB) and/or eNB providing a user plane and control plane protocol termination to a user. FIG. A4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

FIG. 2 shows a structure of a radio frame of a wireless communication system, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS ($15*2^u$) | $N^t_{symb}{}^{slo}$ | $N_{slot}^{frame,u}$ | $N_{slot}^{subframe,u}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N_{symb}^{slot}$ | $N_{slot}^{frame,u}$ | $N_{slot}^{subframe,u}$ |
|---|---|---|---|
| 60 kHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 3 shows a structure of a slot of an NR frame, based on an embodiment of the present disclosure. Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Network Access and Communication Process

A UE may perform a network access process to perform the procedures and/or methods described/proposed in various embodiments of the present disclosure. For example, the UE may receive system information and configuration information required to perform the procedures and/or methods described/proposed above while accessing a network (e.g., base station) and store them in a memory. The configuration information required for the present disclosure may be received via higher layer (e.g., RRC layer; medium access control (MAC) layer, etc.) signaling.

FIG. 4 illustrates initial network access and subsequent communication process of a wireless communication system according to an embodiment of the present disclosure.

In NR, a physical channel and a reference signal may be transmitted using beamforming. If beamforming based signal transmission is supported, a beam management process for aligning beams between a base station (BS) and a UE may be involved. Signals proposed in various embodiments of the present disclosure may be transmitted/received using beamforming. The beam alignment in a radio resource control (RRC)_IDLE mode may be performed based on SSB. On the other hand, the beam alignment in an RRC_CONNECTED mode may be performed based on CSI-RS (in DL) and SRS (in UL). If the beamforming based signal transmission is not supported, the operation related to the beam may be omitted in the following description.

Referring to FIG. 4, a base station (e.g., BS) may periodically transmit SSB (S702). Here, the SSB includes PSS/SSS/PBCH. The SSB may be transmitted using beam sweeping (see FIG. D5). The PBCH may include a master information block (MIB), and the MIB may include scheduling information on remaining minimum system information (RMSI). Thereafter, the base station may transmit the RMSI and other system information (OSI) (S704). The RMSI may include information (e.g., PRACH configuration information) required for the UE to initially access the base station. The UE detects the SSB and then identifies the best SSB. Thereafter, the UE may transmit RACH preamble (Message 1, Msg1) to the base station using PRACH resource linked/corresponding to an index (i.e., beam) of the best SSB (S706). A beam direction of the RACH preamble is associated with the PRACH resource. The association between the PRACH resource (and/or RACH preamble) and the SSB (index) may be configured via system information (e.g., RMSI). Thereafter, as part of the RACH procedure, the base station may transmit a random access response (RAR) (Msg2) as a response to the RACH preamble (S708), the UE may transmit Msg3 (e.g., RRC connection request) using UL grant within the RAR (S710), and the base station may send a contention resolution message (Msg4) (S720). The Msg4 may include RRC connection setup.

If RRC connection is configured between the base station and the UE through the RACH procedure, a subsequent beam alignment may be performed based on SSB/CSI-RS (in DL) and SRS (in UL). For example, the UE may receive SSB/CSI-RS (S714). The SSB/CSI-RS may be used by the UE to generate beam/CSI report. The base station may request the UE to report beam/CSI via DCI (S716). In this case, the UE may generate the beam/CSI report based on SSB/CSI-RS and transmit the generated beam/CSI report to the base station on PUSCH/PUCCH (S718). The beam/CSI report may include information about preferred beams, etc., as a result of beam measurement. The base station and the UE may switch the beam based on the beam/CSI report (S720*a* and S720*b*).

Next, the UE and the base station may perform the procedures and/or methods described/proposed above. For example, the UE and the base station may, based on the configuration information obtained from the network access process (e.g., system information acquisition process, RRC connection process on RACH, etc.), process information of the memory according to the proposal of the present disclosure to transmit a radio signal, or process a received radio signal to store it in the memory. Here, the radio signal may include at least one of PDCCH, PDSCH, and a reference signal (RS) in downlink, and may include at least one of PUCCH, PUSCH, and SRS in uplink.

PDSCH

The PDSCH carries downlink data (e.g., DL-shared channel transport block, DL-SCH TB). The TB is encoded into a codeword (CW) and then is transmitted through scrambling and modulation processes. The CW includes one or more code blocks (CBs). The one or more CBs may be grouped into one CB group (CBG). Based on cell configuration, the PDSCH may carry up to two CWs. The scrambling and modulation are performed per CW, and modulation symbols generated from each CW are mapped to one or more layers. Each layer is mapped to a resource together with DMRS through precoding and is transmitted through the corresponding antenna port. The PDSCH may be dynamically scheduled by the PDCCH or semi-statically scheduled based on higher layer (e.g., RRC) signaling (and/or Layer 1 (L1) signaling (e.g., PDCCH)) (configured scheduling (CS)). Therefore, the PDSCH transmission is accompanied by the PDCCH in the dynamic scheduling, but the PDSCH transmission is not accompanied by the PDCCH in the CS. The CS includes semi-persistent scheduling (SPS).

PDCCH

The PDCCH carries downlink control information (DCI). For example, the PDCCH (i.e., DCI) carries a transport format and resource allocation of a downlink shared channel (DL-SCH), frequency/time resource allocation information for an uplink shared channel (UL-SCH), paging information on a paging channel (PCH), system information on the DL-SCH, frequency/time resource allocation information for an upper-layer control message such as a random access response (RAR) transmitted on the PDSCH, a Tx power control command, information on activation/deactivation of SPS/CS (configured scheduling), or the like. Various DCI formats are provided based on information within the DCI.

Table 5 shows DCI formats transmitted on the PDCCH.

TABLE 5

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, and DCI format 0_1 may be used to schedule TB-based (or TB-level) PUSCH or code block group (CBG)-based (or CBG-level) PUSCH. DCI format 1_0 may be used to schedule TB-based (or TB-level) PDSCH, and DCI format 1_1 may be used to schedule TB-based (or TB-level) PDSCH or CBG-based (or CBG-level) PDSCH (DL grant DCI). The DCI format 0_0/0_1 may be referred to as UL grant DCI or UL scheduling information, and the DCI format 1_0/1_1 may be referred to as DL grant DCI or DL scheduling information. DCI format 2_0 is used to transmit dynamic slot format information (e.g., dynamic SFI) to the UE, and DCI format 2_1 is used to transmit downlink pre-emption information to the UE. The DCI format 2_0 and/or the DCI format 2_1 may be transmitted, based on a group common PDCCH which is PDCCH transmitted to UEs defined as a group, to the UEs in the group.

The PDCCH/DCI includes a cyclic redundancy check (CRC), and the CRC is masked/scrambled with various identifiers (e.g., radio network temporary identifier (RNTI)) based on the owner or usage of PDCCH. For example, if the PDCCH is for a specific UE, the CRC is masked with a cell-RNTI (C-RNTI). If the PDCCH is for paging, the CRC is masked with a paging-RNTI (P-RNTI). If the PDCCH is for system information (e.g., system information block (SIB)), the CRC is masked with system information-RNTI (SI-RNTI). If the PDCCH is for a random access response, the CRC is masked with a random access-RNTI (RA-RNTI).

Table 6 shows usage and transport channel of the PDCCH based on the RNTI. The transport channel represents a transport channel related to data carried by PDSCH/PUSCH scheduled by the PDCCH.

TABLE 6

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |

TABLE 6-continued

| RNTI | Usage | Transport Channel |
|---|---|---|
| Temporary C-RNTI | Contention Resolution (when no valid C-RNTI is available) | DL-SCH |
| Temporary C-RNTI | Msg3 transmission | UL-SCH |
| C-RNTI, MCS (Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS (Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC (Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT (Interruption)-RNTI | Indication pre-emption in DL | N/A |
| SFI (Slot Format Indication)-RNTI | Slot Format Indication on the given cell | N/A |
| SP (Semi-persistent)-CSI (Channel State Information)-RNTI | Activation of Semi-persistent CSI reporting on PUSCH | N/A |

A modulation method of the PDCCH is fixed (e.g., quadrature phase shift keying (QPSK)), and one PDCCH consists of 1, 2, 4, 8, or 16 control channel elements (CCEs) based on an aggregation level (AL). One CCE consists of 6 resource element groups (REGs). One REG is defined by one OFDMA symbol and one (P) RB.

FIG. 5 illustrates an example of one REG structure in a wireless communication system according to an embodiment of the present disclosure.

In FIG. 5, D denotes a resource element (RE) mapped with DCI, and R denotes an RE mapped with DMRS. The DMRS is mapped to first, fifth, and ninth REs in a frequency domain direction within one symbol.

The PDCCH is transmitted through a control resource set (CORESET). The CORESET corresponds to a physical resource/parameter set used to carry PDCCH/DCI within a BWP. For example, the CORESET includes an REG set with a given numerology (e.g., SCS, CP length, etc.). The CORESET may be configured via system information (e.g., MIB) or UE-specific higher layer (e.g., RRC) signaling. Examples of parameter/information used to configure the CORESET are as follows. One or more CORESETs may be configured to one UE, and a plurality of CORESETs may overlap in the time/frequency domain.

- controlResourceSetId: It represents ID information of CORESET.
- frequencyDomainResources: It represents frequency domain resources of CORESET. It is indicated through a bitmap, and each bit corresponds to an RB group (=6 contiguous RBs). For example, the most significant bit (MSB) of the bitmap corresponds to a first RB group within a BWP. An RB group corresponding to a bit with a bit value of 1 is allocated to frequency domain resources of the CORESET.
- duration: It represents time domain resources of CORESET. It represents the number of contiguous OFDMA symbols constructing the CORESET. For example, the duration has value of 1 to 3.
- cce-REG-MappingType: It represents a CCE-to-REG mapping type. An interleaved type and a non-interleaved type are supported.
- precoderGranularity: It represents precoder granularity in frequency domain.
- tci-StatesPDCCH: It represents information (e.g., TCI-StateID) indicating a transmission configuration indication (TCI) state for PDCCH. The TCI state is used to provide a quasi-co-location (QCL) relationship between DL RS(s) in an RS set (TCI-state) and PDCCH DMRS port.
- tci-PresentInDCI: It represents whether a TCI field is included in DCI.
- pdcch-DMRS-ScramblingID: It represents information used for initialization of PDCCH DMRS scrambling sequence.

The REGs in the CORESET are numbered based on a time-first mapping manner. That is, the REGs are numbered sequentially from 0 starting from a first OFDM symbol in the lowest-numbered resource block in the CORESET.

FIG. 6 illustrates an example of a non-interleaved CCE-REG mapping type in a wireless communication system according to an embodiment of the present disclosure.

FIG. 7 illustrates an example of an interleaved CCE-REG mapping type in a wireless communication system according to an embodiment of the present disclosure.

A CCE-to-REG mapping type is configured as either a non-interleaved CCE-REG mapping type or an interleaved CCE-REG mapping type. FIG. 6 illustrates a non-interleaved CCE-REG mapping type, and FIG. 7 illustrates an interleaved CCE-REG mapping type.

- Non-interleaved CCE-REG mapping type (or localized mapping type): 6 REGs for a given CCE construct one REG bundle, and all the REGs for the given CCE are contiguous. The one REG bundle corresponds to one CCE.
- Interleaved CCE-REG mapping type (or distributed mapping type): 2, 3 or 6 REGs for a given CCE construct one REG bundle, and the REG bundle is interleaved in the CORESET. The REG bundle in the CORESET consisting of one OFDM symbol or two OFDM symbols consists of 2 or 6 REGs, and the REG bundle in the CORESET consisting of three OFDM symbols consists of 3 or 6 REGs. The size of the REG bundle may be set for each CORESET.

For the PDCCH reception, a UE may monitor (e.g., blind decoding) a set of PDCCH candidates in the CORESET. The PDCCH candidates represent CCE(s) that the UE monitors for the PDCCH reception/detection. The PDCCH monitoring may be performed in one or more CORESETs on an active DL BWP on each activated cell for which the PDCCH monitoring is configured. The set of PDCCH candidates monitored by the UE is defined as a PDCCH search space (SS) set. The SS set may be a common search space (CSS) set or a UE-specific search space (USS) set.

Table 7 shows a PDCCH search space.

TABLE 7

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured via system information (e.g., MIB) or UE-specific higher layer (e.g., RRC) signaling. No more than S (e.g., ten) SS sets may be configured in each DL BWP of a serving cell. For example, the following parameter/information may be provided to each SS set. Each SS set may be associated with one CORESET, and each CORESET configuration may be associated with one or more SS sets.

searchSpaceId: It represents ID of SS set.

controlResourceSetId: It represents CORESET associated with the SS set.

monitoringSlotPeriodicityAndOffset: It represents a PDCCH monitoring periodicity duration (slot unit) and a PDCCH monitoring duration offset (slot unit)

monitoringSymbolsWithinSlot: It represents first OFDMA symbol(s) for PDCCH monitoring in slots configured for PDCCH monitoring. It is indicated through a bitmap, and each bit corresponds to each OFDMA symbol in the slot. The MSB of the bitmap corresponds to the first OFDM symbol(s) in the slot. OFDMA symbol(s) corresponding to bit(s) with a bit value of 1 corresponds to the first OFDM symbol(s) of the CORESET in the slot.

nrofCandidates: It represents the number of PDCCH candidates per AL={1, 2, 4, 8, 16} (e.g., one selected among 0, 1, 2, 3, 4, 5, 6, and 8).

searchSpaceType: It represents whether the SS type is CSS or USS.

DCI format: It represents a DCI format of PDCCH candidates.

Based on the CORESET/SS set configuration, the UE may monitor PDCCH candidates in one or more SS sets in a slot. An occasion (e.g., time/frequency resources) to monitor the PDCCH candidates is defined as a PDCCH (monitoring) occasion. One or more PDCCH (monitoring) occasions may be configured in the slot.

PUSCH

A PUSCH carries uplink data (e.g., UL-SCH TB) and/or uplink control information (UCI) and is transmitted based on cyclic prefix-orthogonal frequency division multiplexing (CP-OFDM) waveform or discrete Fourier transform-spread-OFDM (DFT-s-OFDM) waveform. When the PUSCH is transmitted based on the DFT-s-OFDM waveform, a UE transmits the PUSCH by applying a transform precoding. For example, if the transform precoding is not available (e.g., transform precoding is disabled), the UE may transmit the PUSCH based on the CP-OFDM waveform, and if the transform precoding is available (e.g., transform precoding is enabled), the UE may transmit the PUSCH based on the CP-OFDM waveform or the DFT-s-OFDM waveform. The PUSCH may be dynamically scheduled by the PDCCH or semi-statically scheduled based on high layer (e.g., RRC) signaling (and/or Layer 1 (L1) signaling (e.g., PDCCH)) (configured scheduling, (CS)). Therefore, the PUSCH transmission is accompanied by the PDCCH in the dynamic scheduling, but the PUSCH transmission is not accompanied by the PDCCH in the CS. The CS includes Type-1 configured grant (CG) PUSCH transmission and Type-2 CG PUSCH transmission. All parameters for the Type-1 CG PUSCH transmission are signaled by higher layer. Some of parameters for the Type-2 CG PUSCH transmission are signaled by higher layer, and remaining parameters are signaled by the PDCCH. Basically, in the CS, the PUSCH transmission is not accompanied by the PDCCH.

PUCCH

The PUCCH carries uplink control information (UCI). The UCI includes the following.

Scheduling Request (SR): information used to request UL-SCH resources.

Hybrid Automatic Repeat and reQuest Acknowledgement (HARQ-ACK): a reception response signal for DL signal (e.g., PDSCH, SPS release PDCCH). The HARQ-ACK response may include positive ACK (simply, ACK), negative ACK (NACK), discontinuous transmission (DTX), or NACK/DTX. The HARQ-ACK may be used interchangeably with A/N, ACK/

NACK, HARQ-ACK/NACK, etc. The HARQ-ACK may be generated in unit of TB/CBG.

Channel Status Information (CSI): feedback information for DL channel. The CSI includes channel quality information (CQI), a rank indicator (RI), a precoding matrix indicator (PMI), a precoding type indicator (PTI), and the like.

Table 8 shows PUCCH formats. The PUCCH formats may be divided based on UCI payload size/transmission length (e.g., the number of symbols constituting PUCCH resources)/transmission structure. The PUCCH formats may be classified into short PUCCH (formats 0 and 2) and long PUCCH (formats 1, 3, and 4) based on the transmission length.

TABLE 8

| PUCCH format | Length in OFDM symbols $N_{symb}^{PUCCH}$ | Number of bits | Usage | Etc. |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols constituting a single PUCCH: 1 to X symbols (e.g., X=2)

Transmission structure: it consists of only UCI signal without DM-RS and transmits an UCI state by selecting and transmitting one of a plurality of sequences.

(1) PUCCH Format 1 (PF1)

Supportable UCI payload size: up to K bits (e.g., K=2)

Number of OFDM symbols constituting a single PUCCH: Y to Z symbols (e.g., Y=4 and Z=14)

Transmission structure: DM-RS and UCI are configured in different OFDM symbols in the form of TDM, and the UCI is in the form in which a specific sequence is multiplied by a modulation (e.g., QPSK) symbol. CDM is supported between a plurality of PUCCH resources (following PUCCH format 1) (within the same RB) by applying cyclic shift (CS)/orthogonal cover code (OCC) to both the UCI and the DM-RS.

(2) PUCCH Format 2 (PF2)

Supportable UCI payload size: more than K bits (e.g., K=2)

Number of OFDM symbols constituting a single PUCCH: 1 to X symbols (e.g., X=2)

Transmission structure: DMRS and UCI are configured/mapped in the form of FDM within the same symbol and are transmitted by applying only IFFT to encoded UCI bits without DFT.

(3) PUCCH Format 3 (PF3)

Supportable UCI payload size: more than K bits (e.g., K=2)

Number of OFDM symbols constituting a single PUCCH: Y to Z symbols (e.g., Y=4 and Z=14)

Transmission structure: DMRS and UCI are configured/mapped to different symbols in the form of TDM and are transmitted by applying DFT to encoded UCI bits. Multiplexing is supported to a plurality of UEs by applying OCC to UCI at a front end of DFT and applying CS (or IFDM mapping) to DMRS.

(4) PUCCH Format 4 (PF4)

Supportable UCI payload size: more than K bits (e.g., K=2)

Number of OFDM symbols constituting a single PUCCH: Y to Z symbols (e.g., Y=4 and Z=14)

Transmission structure: DMRS and UCI are configured/mapped to different symbols in the form of TDM and are transmitted without multiplexing between UEs by applying DFT to encoded UCI bits.

FIG. 8 illustrates an example of a HARQ-ACK procedure for DL data in a wireless communication system according to an embodiment of the present disclosure.

Referring to FIG. 8, a UE may detect a PDCCH in slot #n. Here, the PDCCH includes downlink scheduling information (e.g., DCI formats 1_0 and 1_1) and represents DL assignment-to-PDSCH offset (K0) and PDSCH-HARQ-ACK reporting offset (K1). For example, the DCI formats 1_0 and 1_1 may include the following information.

Frequency domain resource assignment: representing an RB set assigned to PDSCH

Time domain resource assignment: representing K0, i.e., a start location (e.g., OFDM symbol index) and a length (e.g., the number of OFDM symbols) of the PDSCH in a slot PDSCH-to-HARQ_feedback timing indicator: it represents K1

HARQ process number (4 bits): representing a HARQ process ID (Identity) for data (e.g., PDSCH, TB)

PUCCH resource indicator (PRI): indicating PUCCH resources to be used for UCI transmission among a plurality of resources in a PUCCH resource set Afterwards, the UE may receive the PDSCH (e.g., start the PDSCH reception) in slot #(n+K0) based on scheduling information of the slot #n, and then transmit UCI through PUCCH in slot #(n1+K1) (e.g., slot #n1 is a slot in which the PDSCH reception has ended, where n1 is an integer equal to or greater than n+K0). Here, the UCI includes a HARQ-ACK response to the PDSCH. If the PDSCH is configured to transmit up to one TB, the HARQ-ACK response may be configured as 1 bit. If the PDSCH is configured to transmit up to two TBs, the HARQ-ACK response may be configured as 2 bits when spatial bundling is not configured and as 1 bit when the spatial bundling is configured. If HARQ-ACK transmission time for a plurality of PDSCHs is designated as slot #(n1+K1), UCI transmitted in the slot #(n1+K1) includes a HARQ-ACK response for the plurality of PDSCHs.

FIG. 9 illustrates an example of a PUSCH transmission procedure in a wireless communication system according to an embodiment of the present disclosure.

Referring to FIG. 9, a UE may detect a PDCCH in slot #n. Here, the PDCCH includes uplink scheduling information (e.g., DCI formats 0_0 and 0_1). The DCI formats 0_0 and 0_1 may include the following information.

- Frequency domain resource assignment: representing an RB set assigned to PUSCH
- Time domain resource assignment: representing slot offset K2, i.e., a start location (e.g., symbol index) and a length (e.g., the number of OFDM symbols) of the PUSCH in a slot. The start symbol and the length may be indicated through a SLIV (Start and Length Indicator Value) or individually indicated.

Afterwards, the UE may transmit the PUSCH in slot #(n+K2) based on scheduling information of the slot #n. Here, the PUSCH includes UL-SCH TB. If a PUCCH transmission time and a PUSCH transmission time overlap, the UCI may be transmitted through the PUSCH (PUSCH piggyback).

At least a portion of the contents described above may be basically applied commonly to MTC and NB-IoT. The content that may be changed in MTC and NB-IoT is additionally described below.

MTC Network Access Process

An MTC network access process based on LTE is additionally described. The following description may be extended and applied to NR. A MIB in LTE includes ten reserved bits. Five most significant bits (MSBs) of the ten reserved bits within the MIB in the MTC are used to indicate scheduling information for SIB1-BR (System Information Block for bandwidth reduced device). The five MSBs are used to indicate the repetition number of SIB1-BR and a transport block size (TBS). The SIB1-BR is transmitted on PDSCH. The SIB1-BR may not change in 512 radio frames (5120 ms) to allow a combination of a plurality of subframes. Information carried on the SIB1-BR is similar to SIB1 of the LTE system.

An MTC RACH procedure is basically the same as an LTE RACH procedure and is different from the LTE RACH procedure in the following details: the MTC RACH procedure is performed based on a coverage enhancement (CE) level. For example, for PRACH coverage enhancement, whether to repeatedly transmit the PRACH and/or the number of PRACH repetition transmissions may vary per CE level.

Table 9 shows CE mode/level supported in the MTC. The MTC supports two modes (CE mode A and CE mode B) and four levels 1 to 4 for coverage enhancement.

TABLE 9

| Mode | Level | Description |
|---|---|---|
| Mode A | Level 1 | No repetition |
| | Level 2 | Small Number of Repetition |
| Mode B | Level 3 | Medium Number of Repetition |
| | Level 4 | Large Number of Repetition |

The CE mode A is a mode for small coverage enhancement in which full mobility and CSI feedback are supported, and may be configured with no repetition or the small number of repetitions. The CE mode B is a mode for a UE of extremely poor coverage conditions in which CSI feedback and limited mobility are supported, and may be configured with the large number of repetitions.

The base station may broadcast system information including a plurality of (e.g., three) reference signal received power (RSRP) thresholds, and the UE may determine the CE level by comparing the RSRP thresholds and RSRP measurement values. The following information may be independently configured per CE level through system information.

- PRACH resource information: period/offset of PRACH opportunity and PRACH frequency resource
- Preamble group: a set of preambles allocated to each CE level
- The number of repetitions per preamble attempt and the maximum number of preamble attempts
- RAR window time: length of time duration in which RAR reception is expected (e.g., the number of subframes)
- Contention resolution window time: length of time duration in which reception of a contention resolution message is expected The UE may select a PRACH resource corresponding to the CE level of the UE, and then perform PRACH transmission based on the selected PRACH resource. A PRACH waveform used in the MTC is the same as a PRACH waveform used in the LTE (e.g., OFDM and Zadoff-Chu sequence). Signals/messages transmitted after the PRACH may be repeatedly transmitted, and the number of repetitions may be independently configured depending on the CE mode/level.

NB-IoT Network Access Process

An NB-IoT network access process based on LTE is additionally described. The following description may be extended and applied to NR. The PSS, SSS and PBCH of S702 in FIG. 4 are replaced by NPSS, NSSS and NPBCH in NB-IoT, respectively. The details for the NPSS, NSSS and NPBCH may refer to FIG. D5.

An NB-IoT RACH procedure is basically the same as the LTE RACH procedure and is different from the LTE RACH procedure in the following details. Firstly, they have a difference in a RACH preamble format. While a preamble in LTE is based on code/sequence (e.g., zadoff-chu sequence), a preamble in NB-IoT is a subcarrier. Secondly, the NB-IoT RACH procedure is performed based on the CE level. Thus, the PRACH resource is differently allocated per CE level. Thirdly, since SR resource is not configured in NB-IoT, an uplink resource allocation request in NB-IoT is performed using the RACH procedure.

FIG. 10 illustrates an example of a preamble transmission procedure in NB-IoT RACH in a wireless communication system according to an embodiment of the present disclosure.

Referring to FIG. 10, an NPRACH preamble may consist of four symbol groups, and each symbol group may consist of a CP and a plurality of (e.g., five) SC-FDMA symbols. In NR, the SC-FDMA symbol may be replaced by an OFDM symbol or a DFT-s-OFDM symbol. The NPRACH supports only single-tone transmission with 3.75 kHz subcarrier spacing and offers 66.7 us and 266.67 us length CPs to support different cell radii. Each symbol group performs frequency hopping, and a hopping pattern is as follows. Subcarriers transmitting a first symbol group are determined in a pseudo-random manner. A second symbol group performs 1-subcarrier jump, a third symbol group performs 6-subcarrier jump, and a fourth symbol group performs 1-subcarrier jump. For the repetition transmission, a frequency hopping procedure is repeatedly applied, and the NPRACH preamble can perform the repetition transmission {1, 2, 4, 8, 16, 32, 64, 128} times for coverage enhancement. The NPRACH resource may be configured per CE level. The UE may select the NPRACH resource based on the CE level determined depending on a downlink measurement result (e.g., RSRP), and transmit a RACH preamble using the selected NPRACH resource. The NPRACH may be transmitted on an anchor carrier, or transmitted on a non-anchor carrier in which the NPRACH resource is configured.

Discontinuous Reception (DRX) Operation

A UE may perform a DRX operation while performing procedures and/or methods described/proposed in various embodiments of the present disclosure. The UE configured with the DRX discontinuously receives a DL signal and can reduce power consumption. The DRX may be performed in a radio resource control (RRC)_IDLE state, an RRC_INACTIVE state, and an RRC_CONNECTED state.

RRC_CONNECTED DRX

In the RRC_CONNECTED state, the DRX is used for discontinuous reception of the PDCCH. For convenience, the DRX performed in the RRC_CONNECTED state is referred to as RRC_CONNECTED DRX.

FIG. 11 illustrates an example of a DRX cycle for discontinuous reception of PDCCH in a wireless communication system according to an embodiment of the present disclosure.

Referring to FIG. 11, a DRX cycle consists of On Duration and Opportunity for DRX. The DRX cycle defines a time interval in which the On Duration is periodically repeated. The On Duration represents a time interval which the UE monitors in order to receive the PDCCH (or MPDCCH or NPDCCH). If the DRX is configured, the UE monitors the PDCCH during the On-duration. If there is a PDCCH which is successfully detected while monitoring the PDCCH, the UE runs an inactivity timer and maintains an awake state. On the other hand, if there is no PDCCH which is successfully detected while monitoring the PDCCH, the UE enters a sleep state after the On Duration ends. Therefore, if the DRX is configured, the PDCCH monitoring/reception may be discontinuously performed in the time domain in performing the procedures and/or methods described/proposed above. For example, if the DRX is configured, the PDCCH monitoring in various embodiments of the present disclosure may be discontinuously performed based on the DRX configuration in activated cell(s). Specifically, if a PDCCH occasion (e.g., a time duration configured to monitor the PDCCH (e.g., one or more contiguous OFDM symbols)) corresponds to the On Duration, the PDCCH monitoring may be performed, and if the PDCCH occasion corresponds to the Opportunity for DRX, the PDCCH monitoring may be omitted. On the other hand, if the DRX is not configured, PDCCH monitoring/reception may be continuously performed in the time domain in performing the procedures and/or methods described/proposed above. For example, if the DRX is not configured, the PDCCH reception occasion in various embodiments of the present disclosure may be continuously configured. Regardless of whether the DRX is configured, the PDCCH monitoring may be limited in the time duration configured as a measurement gap.

Table 10 represents a process of the UE related to the DRX (RRC_CONNECTED state). Referring to Table 10, DRX configuration information is received via higher layer (e.g., RRC) signaling, and whether the DRX is on or off is controlled by a DRX command of an MAC layer. If the DRX is configured, the UE, as illustrated in FIG. 11, may discontinuously perform the PDCCH monitoring in performing the procedures and/or methods described/proposed in the present disclosure.

TABLE 10

| | Type of signals | UE procedure |
|---|---|---|
| 1$^{st}$ step | RRC signaling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

Here, MAC-CellGroupConfig includes configuration information required for configuring a medium access control (MAC) parameter for a cell group. MAC-CellGroupConfig may include configuration information for the DRX. For example, MAC-CellGroupConfig may include information as follows when defining the DRX.

- Value of drx-OnDurationTimer: Defining a length of a start duration of the DRX cycle
- Value of drx-InactivityTimer: Defining a length of a time duration in which the UE is in an awake state after a PDCCH occasion in which a PDCCH indicating initial UL or DL data is detected
- Value of drx-HARQ-RTT-TimerDL: Defining a length of a maximum time duration until DL retransmission is received after DL initial transmission is received
- Value of drx-HARQ-RTT-TimerDL: Defining the length of a maximum time interval until a grant for UL retransmission is received after a grant for UL initial transmission is received
- drx-LongCycleStartOffset: Defining a time length and a start time point of the DRX cycle
- drx-ShortCycle (optional): Defining a time length of a short DRX cycle Here, if any one of drx-OnDurationTimer, drx-InactivityTimer, drx-HARQ-RTT-TimerDL, and drx-HARQ-RTT-TimerDL is running, the UE monitors the PDCCH every PDCCH occasion while maintaining the awake state.

RRC_IDLE DRX

In the RRC_IDLE state and the RRC_INACTIVE state, the DRX is used for discontinuously receiving a paging signal. For convenience, the DRX performed in the RRC_IDLE (or RRC_INACTIVE) state is referred to as RRC_IDLE DRX.

Thus, if the DRX is configured, the PDCCH monitoring/reception may be discontinuously performed in the time domain in performing the procedures and/or methods described/proposed above.

FIG. 12 illustrates an example of a DRX cycle for paging in a wireless communication system according to an embodiment of the present disclosure.

Referring to FIG. 12, DRX may be configured for discontinuous reception of a paging signal. The UE may receive DRX configuration information from the base station via higher layer (e.g., RRC) signaling. The DRX configuration information may include configuration information for a DRX cycle, a DRX offset, and DRX timer, etc. The UE repeats On Duration and Sleep Duration according to the DRX cycle. The UE may operate in a wakeup mode in the On duration and operate in a sleep mode in the Sleep duration.

In the wakeup mode, the UE may monitor a PO in order to receive a paging message. The PO means a time resource/duration (e.g., subframe or slot) in which the UE expects to receive the paging message. PO monitoring includes monitoring PDCCH (or MPDCCH or NPDCCH) (hereinafter, referred to as paging PDCCH) scrambled by P-RNTI in the PO. The paging message may be included in the paging PDCCH or included in a PDSCH scheduled by the paging PDCCH. One or a plurality of PO(s) may be included in a paging frame (PF), and the PF may be periodically configured based on UE ID. Here, the PF may correspond to one radio frame, and the UE ID may be determined based on an international mobile subscriber identity (IMSI) of the UE. If the DRX is configured, the UE monitors only one PO per DRX cycle. If the UE receives the paging message indicating changes in an ID of the UE and/or system information in the PO, the UE may perform a RACH procedure in order to initialize (or reconfigure) connectivity with the base station, or receive (or acquire) new system information from the base station. Thus, when performing the procedure and/or method described/proposed above, the PO monitoring may be discontinuously performed in the time domain in order to perform the RACH for connectivity with the base station or receive (or acquire) the new system information from the base station.

FIG. 13 illustrates an example of an extended DRX (eDRX) cycle in a wireless communication system according to an embodiment of the present disclosure.

According to DRX cycle configuration, a maximum cycle duration may be limited to 2.56 seconds. However, for a UE, in which data transmission/reception is intermittently performed, such as an MTC UE or an NB-IoT UE, unnecessary power consumption may occur during the DRX cycle. In order to further reduce power consumption of the UE, a method for greatly extending the DRX cycle based on a power saving mode (PSM) and a paging time window or paging transmission window (PTW) has been introduced, and the extended DRX cycle is simply referred to as an eDRX cycle. Specifically, paging hyper-frames (PH) is periodically configured based on the UE ID, and the PTW is defined in the PH. The UE may perform the DRX cycle in a PTW duration and switch to the wakeup mode in the PO of the UE to monitor the paging signal. The PTW duration may include one or more DRX cycles (e.g., wakeup mode and sleep mode) of FIG. 32. The number of DRX cycles in the PTW duration may be configured via a higher layer (e.g., RRC) signal by the base station.

Wake-Up Signal (WUS)

In MTC and NB-IoT, a WUS may be used to reduce power consumption related to paging monitoring. The WUS is a physical layer signal indicating whether or not a UE monitors a paging signal (e.g., MPDCCH/NPDCCH scrambled by P-RNTI) depending on cell configuration. For a UE to which eDRX is not configured (i.e., only DRX is configured), the WUS may be associated with one PO (N=1). On the other hand, for a UE to which eDRX is configured, the WUS may be associated with one or more POs (N>1). If the WUS is detected, after the UE is associated with the WUS, the UE may monitor N POs. On the other hand, if the WUS is not detected, the UE may maintain a sleep mode by omitting the PO monitoring until the UE monitors a next WUS.

FIG. 14 illustrates an example of a timing relationship of WUS and PO in a wireless communication system according to an embodiment of the present disclosure.

A UE may receive configuration information for WUS from a base station and monitor the WUS based on the WUS configuration information. For example, the configuration information for WUS may include a maximum WUS duration, the number of POs associated with the WUS, gap information, etc. The maximum WUS duration represents a maximum time duration in which the WUS can be transmitted, and may be expressed in a ratio with the maximum repetition number (e.g., Rmax) related to PDCCH (e.g., MPDCCH, NPDCCH). The UE may expect WUS repetition transmission in the maximum WUS duration, but the actual number of WUS transmissions may be less than the maximum number of WUS transmissions in the maximum WUS duration. For example, for a UE in good coverage, the WUS repetition number may be small. For convenience, a resource/occasion on which the WUS can be transmitted in the maximum WUS duration is referred to as a WUS resource. The WUS resource may be defined as a plurality of consecutive OFDM symbols and a plurality of consecutive subcarriers. The WUS resource may be defined as a plurality of consecutive OFDM symbols and a plurality of consecutive subcarriers in a subframe or a slot. For example, the WUS resource may be defined as 14 consecutive OFDM symbols and 12 consecutive subcarriers. The UE detecting the WUS does not monitor the WUS until a first PO associated with the WUS. If the UE fails to detect the WUS during the maximum WUS duration, the UE does not monitor a paging signal in POs associated with the WUS (or the UE remains in a sleep mode).

[Start of the Present Disclosure]

Extended reality (XR) is used as a general term for virtual reality (VR), augmented reality (VR), mixed reality (MR), etc., and has been recently considered an important media application for 5G in the industry. In various embodiments of the present disclosure, XR service or XR application is also referred to as XR. In order to support the XR in a wireless communication system, it is necessary to understand and meet requirements required by the XR. The XR requirements have a feature of simultaneously requiring low latency, high reliability, and high data rate, unlike other 3GPP use cases. Reflecting this feature, the XR is also referred to as low-latency eMBB or high data rate URLLC use case.

In order to successfully support the XR in the wireless communication system, improvements may be required in terms of cell capacity (the number of XR users that can be simultaneously supported per cell), terminal power saving, mobility, coverage, or the like. Among these, improvements in the cell capacity and the terminal power saving are known to be the most urgent. This is that the cell capacity may be a level for about a few people when currently assuming a typical XR scenario, and power supply may not be smooth compared to the power required when considering various form factors (e.g., AR glass, HMD, etc.) of an XR terminal.

Various embodiments of the present disclosure provide a solution to problems of insufficient cell capacity and terminal power consumption that may occur when intending to support XR in the wireless communication system. The expected effect of the present disclosure is to smoothly support the XR in the wireless communication system in terms of number of users and terminal battery life.

Various embodiments of the present disclosure propose using XR transmission/reception characteristics, i.e., characteristics of XR traffic, in order to solve the above problems, i.e., the problems of insufficient cell capacity and terminal power consumption. The characteristics of XR traffic to be used may be summarized as follows.

[Characteristics of XR Traffic]

XR traffic may mainly consist of scene, video stream, audio stream, pose/control, data, etc. Among these, a component of the XR traffic that should be considered as the highest priority for the capacity and power saving enhancement is the video stream. This reason is that it is dominant in terms of average data rate and at the same time requires low latency and high reliability.

The video stream may be transmitted every specific period on a per video frame (also referred to as a frame or an application packet) basis in terms of application layer. For example, a frame transmission period of a video stream with a frame rate of 60 fps (frames per second) may be 1/(60 fps)≈16.7 ms/frame, i.e., 16.7 ms per frame. A frame in the application layer may be transmitted to a base station (BS) in the form of IP packet, and a frame in MAC layer or PHY layer may be transmitted on a per transport block (TB) basis. In this case, based on a relationship between a frame size and a TB size, one frame may be mapped to one TB and transmitted, or may be mapped to N (>1) TBs and transmitted in the form of burst. The former is referred to as 1-to-1 mapping, and the latter is referred to as 1-to-N mapping.

Latency requirement of the XR traffic, particularly, a DL video stream may be defined as air interface packet delay budget (PDB), or may be abbreviated as air PDB in various embodiments of the present disclosure. An air interface delay to which the air PDB is applied may be defined as follows.

"Air interface delay is measured from the point when a packet arrives at gNB to the point when it is successfully delivered to UE."

The packet may mean an application packet (=video frame), or mean an IP packet. The former is referred to as frame-level air PDB, and the latter is referred to as packet-level air PDB.

Further, TB-level air PDB information for latency control on a per TB basis may be newly defined at gNB.

For example, air PDB requirement may have a value of 10 ms in VR/AR, and have a value of 15 ms in CG. The air PDB requirement may also be used as a criterion to determine a success or failure for frame/packet/TB transmission targeting an XR UE. That is, if the air PDB requirement is not satisfied, the transmission may be considered failed.

In summary, the characteristics of the XR traffic may be as follows. (example of the DL video stream)

TABLE 11

| | |
|---|---|
| (1) | Bitrate |
| (1-1) | VR/AR: 30/45/60 Mbps @ 60 fps |
| (1-2) | CG: 8/30 Mbps @ 60 fps |
| (2) | Frame rate: 60 fps (frames per second) |
| (3) | Air PDB |
| (4) | 10 ms in DL for VR/AR |
| (5) | 15 ms in DL for CG |

The base station may use the traffic characteristics of the video stream for XR cell capacity enhancement. For example, if traffic transmission for multiple XR UEs is required, the base station can improve XR capacity using a scheme of scheduling to temporally distribute the XR UEs so as to prevent traffic between the different XR UEs from converging at the same time. In this case, a different scheduling delay may be added for each XR UE by the scheduling scheme of the base station. According to the definition of the air interface delay, a scheduling delay generated by a scheduler within the base station may be included in the air interface delay. In this case, for frame/packet/TB retransmission within the air PDB, a time duration allowed for the BS/UE is reduced accordingly. If the UE does not recognize this situation and expects retransmission based on a nominal air PDB, the UE does not meet the air PDB requirement and ends up monitoring PDCCH to receive the unused TB, which results in unnecessary power consumption.

Various embodiments of the present disclosure propose a BS operation and UE operation for solving the above problem, and a signaling method for supporting the operations. Various embodiments of the present disclosure also propose a solution to when one frame is transmitted to multiple TBs, i.e., the 1-to-N mapping. A base station (BS) that recognizes a relationship between frame, packet, and TB (e.g., 1-to-N mapping relationship) and generates/transmits/indicates scheduling and PS control information optimized to the relationship is referred to as a traffic-aware BS or a T-BS, and a UE or a XR UE supporting a PS control operation via the PS control information generated by the T-BS is referred to as a T-UE or a T-XR UE.

In various embodiments of the present disclosure, a terminal or a UE supporting the XR is referred to as a XR terminal or a XR UE. The XR UE may include a cloud gaming (CG) UE in addition to a VR/AR/MR UE. Considering that the present disclosure can be equally applied to the CG since traffic characteristics of the CG are similar to the traffic characteristics of the XR, the XR can be used and interpreted by being replaced with the CG in various embodiments of the present disclosure. Traffics of DL data and UL data for supporting the XR are referred to as a XR DL traffic and a XR UL traffic, respectively.

In various embodiments of the present disclosure, the scheduling delay may be more generally replaced by scheduling information. The scheduling information may be information on application/service and/or characteristics of traffic that the base station receives (together with frame/packet) from higher layer (e.g., application), and may be information representing an importance in terms of, for example, latency or reliability. Alternatively, the scheduling information may be simply in the form of a flag (e.g., XR flag) containing the above meaning.

The operations and the methods proposed in various embodiments of the present disclosure can be applied to both DL and UL. To this end, for example, DL can be applied/interpreted by being replaced by UL, and DL assignment can be applied/interpreted by being replaced by UL grant.

The operations and the methods proposed in various embodiments of the present disclosure can be applied by separate configuration and/or UE capability only when DRX and/or DTX are configured as a UE PS-related operation. Alternatively, the operations and the methods may be supported by separate configuration and/or UE capability regardless of whether or not DRX and/or DTX are configured.

The operations and the methods proposed in various embodiments of the present disclosure can be applied regardless of the cause of air PDB fluctuations. That is, the cause of air PDB fluctuations may not be limited to cases generated by the multiplexing or scheduling scheme between the XR UEs in the BS described in various embodiments of the present disclosure. For example, even from an intra-UE perspective, an additional delay may be generated or changed by a video encoding process or higher layer before the BS arrives. The operations and the methods can be applied to these cases.

Generation/transmission/indication of TB-level PS control information, frame-level PS control information, and packet-level PS control information proposed in various embodiments of the present disclosure and the application of the UE operation corresponding to this may not be limited to the 1-to-N mapping. That is, they can be applied to both the 1-to-1 mapping and the 1-to-N mapping.

In various embodiments of the present disclosure, in "PDSCH/PUSCH scheduled without DCI", the meaning of "without DCI" may include the meaning of "without dynamic grant" or "transmitted through semi-persistent scheduling (SPS) or configured grant (CG) resources."

A UE power saving operation to be controlled through the methods proposed in various embodiments of the present disclosure may include an operation of monitoring PDCCH and an operation of transmitting HARQ-ACK. These operations may be operations aimed at retransmission reception. In this sense, in various embodiments of the present disclosure, "monitoring PDCCH" may be interpreted and applied by being replaced by "transmitting HARQ-ACK" or "monitoring PDCCH or transmitting HARQ-ACK", or may include the above meaning. Further, "transmitting HARQ-ACK" may be interpreted and applied by being limited to "transmitting NACK of HARQ-ACK." In this case, this may mean that ACK transmission is allowed.

BS Operation

A base station may apply a distributed scheduling scheme so that traffics between XR UEs do not temporally overlap to maximize XR cell capacity (the number of simultaneously supportable XR UEs per cell). For example, the distributed scheduling scheme may be a scheme in which when traffics for UE1, UE2, and UE3 arrive at the BS at the same time, scheduling delays of D1, D2, and D3 (D1<D2<D3) are respectively applied to the UE1, the UE2, and the UE3, and a TB and a PDSCH transmitting the TB are transmitted by being distributed temporally. In this instance, if all the UE1/UE2/UE3 satisfy the same air PDB requirement, there may be a problem in that the UE3 has the smallest air PDB margin. An air PDB margin for each XR UE may be a value calculated as follows based on the air PDB requirement and the scheduling delay per UE.

Per-UE air PDB (or latency) margin=air PDB requirement−per-UE scheduling delay−alpha where alpha is a sum of delays additionally generated by factors other than the per-UE scheduling delay Example 1

For example, when the air PDB requirement is 10 ms and scheduling delay values respectively corresponding to XR UE1, XR UE2, and XR UE3 are Oms, 3 ms, and 6 ms, if there is no additional delay (alpha=0), per-UE air PDB margin values for the UE1, the UE2, and the UE3 may be 10 ms, 7 ms, and 4 ms, respectively. The PDB margin may ultimately mean the time that the BS/UE can use for retransmission of the frame/packet/TB (for the PDCCH monitoring) within the limit satisfying the air PDB requirement.

[XR Scheduling Method]

In order to solve a problem in that a specific UE (XR UE3 in the above example) continuously lacks per-UE air PDB margin (i.e., due to a relative lack of retransmission opportunities), and thus frame/packet/TB transmission success rate of the UE is relatively low, a base station may consider a delay fair scheduling scheme in addition to the distributed scheduling scheme. The delay fair scheduling scheme may be a scheme of scheduling the UEs to prioritize applying a scheduling delay to all the XR UEs as equally as possible. A scheduling scheme of simultaneously applying the distributed scheduling scheme and at the same time the delay fair scheduling scheme is referred to as a delay fair distributed scheduling method in various embodiments of the present disclosure. For example, when it is assumed that scheduling delays respectively corresponding to UE1, UE2, and UE3 are D1, D2, and D3, and XR traffics for the UE1, the UE2, and the UE3 arrive at the base station at the same time, a scheduling delay D value for each UE at each scheduling time may be listed in ascending order of size so as to compare the distributed scheduling scheme with the delay fair distributed scheduling method, and may be as follows.

Example 2

(1) Distributed Scheduling Scheme
- (1-1) If scheduling delays of D1, D2, and D3 (D1<D2<D3) have been respectively applied to UE1, UE2, and UE3 at a first scheduling time, the same order even at a next scheduling time (e.g., a next traffic period) may be maintained as follows.
- (1-2) First scheduling time: D1, D2, D3 (i.e., D1<D2<D3)
- (1-3) Second scheduling time: D1, D2, D3 (i.e., D1<D2<D3)
- (1-4) Third scheduling time: D1, D2, D3 (i.e., D1<D2<D3)

(2) Delay Fair Distributed Scheduling Method
- (2-1) If scheduling delays of D1, D2, and D3 (D1<D2<D3) have been respectively applied to UE1, UE2, and UE3 at a first scheduling time, a size of a scheduling delay value between the UEs at a subsequent scheduling time (e.g., a next traffic period) may be sequentially changed as follows.
- (2-2) First scheduling time: D1, D2, D3 (i.e., D1<D2<D3)
- (2-3) Second scheduling time: D3, D1, D2 (i.e., D3<D1<D2)
- (2-4) Third scheduling time: D2, D3, D1 (i.e., D2<D3<D1)

The delay fair distributed scheduling method may be a method of simultaneously ensuring capacity enhancement and fairness on performance per XR UE.

Various embodiments of the present disclosure propose the distributed scheduling scheme as an example of the scheduling scheme for cell capacity enhancement. The distributed scheduling scheme is a scheduling scheme based on the fact that, when traffic arrives at multiple UEs at the same time or at the similar time, sequentially sending the traffics "in the order of arrival" but temporally distributing the traffics can be helpful in terms of cell capacity. On the other hand, if gradually larger delay is sequentially applied in a maintained state of the arrival order or in the fixed UE order and is temporally distributed, a specific UE may always suffer a loss due to a reduction in remaining PDB or PDB/latency margin. In order to improve this, that is, for fairness in terms of scheduling delay, a scheduling scheme that changes the UE order in each period not "the order of arrival" or the fixed UE order is a "delay fair" distributed scheduling method newly proposed in various embodiments of the present disclosure. According to various embodiments of the present disclosure, when gradually larger scheduling delay is sequentially applied per UE in each period, the order of applied UE may be changed in each period.

The delay fair distributed scheduling method is a scheduling method of simultaneously ensuring cell capacity enhancement and fairness on performance per XR UE when periodic XR traffic is scheduled to multiple UEs. According to an embodiment, when gradually larger scheduling delay is sequentially applied per UE within the period in each period for distributed scheduling targeting the multiple UEs, the UE order may be changed by a specific order or may be shuffle and applied in each period.

[Generation of PS Control Information for XR UE Power Saving]

A base station may generate control information for UE power saving per XR UE (hereinafter, PS control information) considering the scheduling delay per XR UE (additionally) generated by the scheduling method. It has been described above that the per-UE air PDB margin may vary per XR UE by a BS scheduling method. The per-UE air PDB margin may mean the time until the PDCCH monitoring is required in order for the BS/UE to be able to receive or to receive retransmission of the frame/packet/TB within the limit satisfying the air PDB requirement. In this instance, an operation for retransmission reception exceeding the per-UE air PDB margin (e.g., PDCCH monitoring operation) may unnecessarily consume the UE power. For example, in the [Example 1], the fact that the XR UE1, the XR UE2, and the XR UE3 perform the PDCCH monitoring for TB retransmission reception equal to or greater than 10 ms, 7 ms, and 4 ms, respectively may correspond to the unnecessary power consumption. If the air PDB requirement is not satisfied even when the retransmission is successfully received subsequently, the frame/packet/TB will eventually become unused. In order to remove the unnecessary UE power consumption, the PS control information can be used to control the PDCCH monitoring operation of the XR UE or indicate the PDCCH monitoring operation to stop.

The PS control information may be information generated based on the air PDB margin or latency margin information, and may be updated every scheduling time/unit or every a specific period (e.g., frame period or TB burst period). For example, the PS control information may mean the maximum duration until a DL retransmission for an XR UE is received or the maximum duration until an XR UE shall monitor a PDCCH to receive DL retransmission scheduling information.

More specifically, the PS control information may be information that defines an XR-specific reTx timer (referred to as an XR-reTx timer) and indicates a size of the timer (XR-reTx timer method). The XR-reTx timer may be used separately from a reTx timer used in the conventional NR UE for the same low-latency application as XR, and its size may be generally set to be smaller than the reTx timer size.

Alternatively, the PS control information may be information indicating the number of HARQ reTx, the number of PDCCH MOs for PDSCH reTx scheduling DCI, etc. Alternatively, the PS control information may be information dynamically indicating the conventional reTx timer size (affecting active time) defined in TS 38.321 MAC spec.

Alternatively, if both the XR-reTx timer and the reTx timer are supported and/or configured, the PS control information may be information indicating a timer that defines a PDCCH monitoring duration to be used by the XR UE for retransmission PDSCH reception. That is, the PS control information may be information indicating whether to use a separate XR-reTx timer for the XR UE.

Alternatively, the PS control information may be information indicating a value to be subtracted from the fixed reTx timer or XR-reTx timer size. For example, the value to be subtracted may be a value determined by the per-UE scheduling delay and/or alpha. For example, in a state in which the (XR-)reTx timer size is set to 10 ms corresponding to the PDB requirement, the base station may indicate a value corresponding to per-UE scheduling delay+alpha through the PS control information, and the UE may require the PDCCH monitoring for PDSCH retransmission reception only during the per-UE air PDB margin, i.e., air PDB requirement-per-UE scheduling delay-alpha.

Method of Transmitting PS Control Information for XR UE

As described above, a BS scheduling delay may vary per XR UE every scheduling time/unit. Therefore, XR UE PS control information based on this may also be generated every scheduling time/unit and may need to be transmitted to a UE. For this reason, the XR UE PS control information may be transmitted to the XR UE via DCI. For example, it can be seen from the example of the delay fair distributed scheduling method that the scheduling delay may vary per UE every scheduling time/unit. Alternatively, even if a simple distributed scheduling scheme is used, the scheduling delay may vary by changes in the number of simultaneously scheduled UEs, etc. The DCI for transmitting the PS control information may be scheduling DCI scheduling a PDSCH transmitting XR traffic or may be SPS/CG activation/deactivation DCI when the XR traffic is transmitted using SPS/CG, etc.

The DCI transmitting the PS control information may be to directly transmit the PS control information or select or indicate among values pre-configured via RRC signaling. As an example of the latter, in the XR-reTx timer related method, the timer size may be pre-configured as one value or multiple values via RRC signaling, and if the corresponding timer is enabled via the DCI or multiple values are set, the DCI may indicate the timer size at the same time as the enabling.

The DCI transmitting the PS control information may be transmitted using separate RNTI (e.g., X-RNTI) and/or separate DCI format (e.g., DCI format X). If X-RNTI is used, an XR UE may receive DCI transmitting the PS control information (and scheduling information) using the X-RNTI. A reason why the DCI transmitting the PS control information is distinguished from DCI for other usage using the separate RNTI and/or the separate DCI format may be because a large amount of DCI payload is added for the PS control information transmission, and thus it cannot share a field with the DCI for other usage or intends to simultaneously transmit the PS control information to multiple XR UEs. Otherwise, the PS control information may be transmitted using one of DCI format and RNTI that have been conventionally used, that is, using a used and/or reserved field.

If UE control information is indicated using DCI as above, a synchronized operation between the BS and the UE may be impossible due to a DCI reception error. Because the main purpose of indicating through the DCI is to stop the PDCCH monitoring for the UE power saving, if the XR UE fails to receive the corresponding information, the XR UE performs the PDCCH monitoring based on the reTx timer in the same manner as the conventional UE operation. In such a situation, in order to check whether to receive the PS control information of the UE and to retransmit the PS control information if the check is not possible, that is, for a reliability problem of a method of transmitting the PS control information based on the DCI (e.g., sync problem between the BS/UE due to missing of DCI for transmission of the PS control information), HARQ-ACK feedback transmission for DCI transmitting the PS control information may be required. For example, if the PS control information is transmitted to DCI format X, the following can be specified in the spec.

A UE is expected to provide HARQ-ACK information in response to a detection of a DCI format X carrying/including/indicating PS control info after Ns symbols from the last symbol of a PDCCH providing the DCI format X.

In this instance, Ns value may be a value defined per SCS, and may be included as a part of information for XR UE PS support and set to one value (e.g., Ns=1) or multiple values by RRC signaling. In the latter, DCI (transmitting the PS control information) may indicate a specific value among the multiple values. Alternatively, the DCI may directly designate a specific Ns value.

Alternatively, the BS may transmit the PS control information to the XR UE via MAC CE. This may be a method to overcome limitation on the payload size or the reliability problem that may be problems in the method of transmitting the PS control information based on DCI. The MAC CE transmitting the PS control information may be distinguished by LCID included in an MAC sub-header.

The PS control information transmitted via DCI or MAC CE may be scheduled via the DCI or the MAC CE or applied from an operation associated with frame/packet/TB transmitted/received through activation/deactivation resources, or may be applied from a next period in the case of the periodic transmission. Alternatively, the PS control information includes information on an application time and may allow the BS to indicate the application time.

XR UE Operation

A UE may perform a UE power saving operation (e.g., determining whether to continue/stop PDCCH monitoring) by receiving the XR UE PS control information. For example, the UE may perform a PDCCH monitoring operation (for retransmission reception) for time indicated or required in the PS control information and stop the PDCCH monitoring for the UE power saving. The UE may receive the PS control information via DCI (e.g., scheduling DCI, SPS/CG activation/deactivation DCI) or MAC CE. When receiving the PS control information via the DCI, the UE may need to transmit HARQ-ACK feedback for the DCI transmitting the PS control information so as to solve the reliability problem described above.

If the XR-reTx timer proposed above is used, after the XR UE sets a size of the XR-reTx timer based on the PS control information, the XR UE may start the timer under a specific condition and then stop an operation for retransmission reception of the packet (e.g., PDCCH monitoring) if the XR-reTx timer expires. Determining whether to continue/stop the PDCCH monitoring may be to stop the overall PDCCH monitoring or stop PDCCH monitoring for a specific purpose. For example, the latter may be to stop the PDCCH monitoring limited to the PDCCH monitoring operation for PDSCH reTx scheduling DCI reception. Alternatively, the XR UE may determine whether to apply the conventional reTx timer or the XR-reTx timer based on the XR UE PS control information.

[XR-reTx Timer Start Condition]

The XR-reTx timer may start after the XR UE transmits NACK for a PDSCH scheduled via DCI or without the DCI (the same as a start condition of the conventional reTx timer). That is, only if the XR UE does not successfully receive the PDSCH, the XR-reTx timer may start. That is, if the XR UE does not successfully receive the PDSCH, the XR UE may be intended to early terminate the PDCCH monitoring operation for the retransmission reception by setting the size of the XR-reTx timer only as necessary (smaller than the size of the conventional reTx timer) considering XR scheduling delay not using the preset fixed size of the conventional reTx timer. For example, a start time of the XR-reTx timer may start at a first symbol after NACK transmission. (example 3)

[Example 3] XR-reTx Timer Starts at a First Symbol after NACK Transmission

[if a HARQ-RTT-Timer expires:]

if the data of the corresponding HARQ process was not successfully decoded:

start the XR-reTx timer for the corresponding HARQ process in the first symbol after the expiry of HARQ-RTT-Timer.

HARQ-RTT-Timer: the minimum duration before a DL assignment for HARQ retransmission is expected by the MAC entity.

In the example 3, because HARQ-RTT-Timer is not affected by XR traffic characteristics, the timer may be shared with a non-XR UE or may be the same size as the non-XR UE. In this case, the reTx timer and the XR-reTx timer may have the same start time and may be different, by the PS control information, only in an expired time.

If the XR UE successfully receives the PDSCH scheduled via DCI or without the DCI and transmits ACK, the XR UE does not require the PDCCH monitoring operation for at least DL retransmission scheduling information reception. In this case, the XR-reTx timer may not start.

T-BS Operation

A T-base station (BS) may basically support the "BS operation" described above. The T-BS may additionally support the following operation. Unless specifically stated, in this clause, the base station may be replaced by the T-BS or may include the meaning of the T-BS.

As mentioned above, one frame may be mapped to one packet and/or TB (1-to-1 mapping) or multiple packets and/or TBs (1-to-N mapping) and transmitted. Further, air PDB may be defined as frame-level, packet-level, or TB-level. In the 1-to-1 mapping, the [XR scheduling method] described above may be applied. In this case, the air PDB may be defined as the frame-level or the TB-level and applied. In the 1-to-N mapping, the BS may be simply separated from the application stage and operated to satisfy the TB-level air PDB. In this case, the BS may generate the PS control information per TB or per HARQ process (designated per TB) and operate. Alternatively, the BS/UE operation may be defined to satisfy the frame-level air PDB. In this case, the distributed scheduling scheme may be applied between (T-)XR UEs for cell capacity enhancement, and a method of scheduling N (>1) TBs, which are temporally contiguous, constituting the same frame may be considered. For example, if the frame-level air PDB is 10 ms and TB1 and TB2 mapped to the same frame are sequentially transmitted at intervals of 5 ms, an air PDB margin of the TB2 may be reduced to less than 5 ms, that is, the number of times of possible reTx of the TB2 may be reduced accordingly. Hence, the expected cell capacity gain can be offset or even reduced.

[T-XR Scheduling Method]

When one frame is mapped to multiple TBs (1-to-N mapping) and transmitted, D1, D2, and D3 values corresponding to each UE in the [XR scheduling method] described above may be frame-level, packet-level, or TB-level scheduling delay. In the 1-to-N mapping, even if the delay fair distributed scheduling method is applied, even if the scheduling order is changed between the UEs according to the rule, N TBs constituting the same frame of the same UE may be temporally contiguous and scheduled.

[Generation of PS Control Information for T-XR UE Power Saving]

When one frame is mapped to multiple TBs (1-to-N mapping) and transmitted, the BS may generate PS control information (TB-level PS control information) per TB or per HARQ process (designated per TB). In this instance, the TB-level PS control information may be generated based on TB-level air PDB (margin) or scheduling delay per TB. In this case, the BS may operate the reTx timer per TB or per HARQ process (designated per TB) and configure/indicate the size of the reTx timer to vary depending on the order or temporal location of the TB, that is, so that the size of the reTx timer of the TB scheduled later has a smaller value.

Alternatively, when one frame is mapped to multiple TBs (1-to-N mapping) and transmitted, the BS may generate PS control information (frame-level PS control information) per frame. In this instance, the frame-level PS control information may be generated based on frame-level air PDB (margin) or scheduling delay per frame. In this case, one PS control signal may be generated/configured/indicated on a per frame basis, that is, within a frame. In this instance, the PS control signal may be generated/configured/indicated in a specific order within a frame or based on a TB (reference TB) at a temporal location so as to remove ambiguity between the BS and the UE. The order and temporal location of the reference TB within the frame may be predefined, or may be configured via RRC signaling, or may be included in the PS control information and indicated to the UE through the method of transmitting the PS control information.

Alternatively, the BS may generate PS control information (packet-level PS control information) on a per packet basis. The packet-level PS control information may be generated based on packet-level air PDB (margin) or scheduling delay per packet. In this case, one PS control signal may be generated/configured/indicated on a per packet basis, that is, within a packet. In this instance, the reference TB may be defined in the same method as the frame-level PS control information and may be signaled to the UE.

(T-)XR UE Related Capability Information and Method of Reporting to (T-)BS

Unless specifically stated, in this clause, a base station may include the meaning of a T-BS.

The BS may signal the (T-)XR UE PS control information (including whether to support) and/or information for supporting a (T-)XR UE (including whether to support) per cell. For example, the information may be provided in the form of cell-specific parameter via system information (MIB, SIB1, SI messages) or dedicated RRC signaling.

Broadcast via system information (MIB, SIB1, SI messages): the (T-)XR UEs may understand the (T-)XR UE PS control information (including whether to support) and/or the information for supporting the (T-)XR UE (including whether to support) of the cell in a cell access step from RRC_IDLE state.

Dedicated RRC signaling: the (T-)XR UE PS control information (including whether to support) and/or the information for supporting the (T-)XR UE (including whether to support) may be provided per cell when configuring/adding a serving cell for CA or DC.

Alternatively, the information may be transmitted to each (T-)XR UE in the form of UE-specific parameter via dedicated RRC signaling.

To support an operation of the (T-)XR UE distinguished from a non-(T-)XR UE, the (T-)XR UE may need to report its (T-)XR related capability information to a BS. The (T-)XR related capability information may be specific feature(s) (or a set of features) supported by the (T-)XR UE, or may be (T-)XR UE type information if is it is defined as a separate UE type. FIG. 1 illustrates a flow chart of a procedure of reporting the (T-)XR related capability information to the BS. The reporting procedure may reuse a UE capability transfer procedure as defined in TS 38.331, and the BS may acquire (T-)XR related capability information through UE capability information reception and use information acquired in scheduling of the (T-)XR UE.

FIG. 15 illustrates an example of a process for a report procedure of (T-)XR related capability information according to various embodiments of the present disclosure.

In step S1510, a base station/network requests UE capability from a UE in RRC_CONNECTED state.

In step S1520, the UE transmits (T-)XR related capability information to UE capability information.

Various embodiments of the present disclosure can be combined with each other.

From an implementation perspective, operations of the UE according to various embodiments of the present disclosure may be processed by a device (e.g., processors 102 and 202 of FIG. 19) of FIGS. 18 to 26 to be described later. Further, operations of the UE according to various embodiments of the present disclosure may be stored in a memory (e.g., memories 104 and 204 of FIG. 19) in the form of commands/programs (e.g., instructions, executable codes) for running at least one processor (e.g., processors 102 and 202 of FIG. 19).

[Description Related to UE Operation]

Below, the above-described embodiments are described in detail from a perspective of an operation of a UE with reference to FIG. 16. Methods to be described below are merely distinguished for convenience of explanation. Thus, as long as the methods are not mutually exclusive, it is obvious that partial configuration of any method can be substituted or combined with partial configuration of another method.

FIG. 16 illustrates an operation process of a UE in a wireless communication system according to an embodiment of the present disclosure.

According to various embodiments of the present disclosure, there is provided a method performed by a user equipment (UE) supporting extended reality (XR) in a wireless communication system.

In step S1610, the UE receives, from a base station (BS), control information related to a power saving operation. According to various embodiments of the present disclosure, the UE receives the control information from the BS on a per frame basis. According to various embodiments of the present disclosure, when a plurality of transport blocks (TBs) constituting a traffic is mapped to one frame, the control information related to the power saving operation is generated based on delay related information of the traffic.

In step S1620, the UE performs the power saving operation configured based on the control information.

According to various embodiments of the present disclosure, the power saving operation within the control information may be configured per frame or per hybrid automatic repeat request (HARQ) process constituting the frame.

According to various embodiments of the present disclosure, the control information may include information for a XR-retransmission (reTx) timer of the UE. If the XR-reTx timer expires, the power saving operation may include an operation of stopping a monitoring of a physical downlink control channel (PDCCH) by the UE.

According to various embodiments of the present disclosure, the XR-reTx timer may start after the BS receives, from the UE, an acknowledgement (ACK) response or a negative acknowledgement (NACK) response to a physical downlink shared channel (PDSCH).

According to various embodiments of the present disclosure, the XR-reTx timer may start at a first symbol after the BS receives, from the UE, the ACK response or the NACK response to the PDSCH.

According to various embodiments of the present disclosure, the XR-reTx timer may start after the control information is transmitted to the UE from the BS.

According to various embodiments of the present disclosure, if the XR-reTx timer for a first TB within the frame or a last TB within the frame expires, the power saving operation may include an operation of stopping the monitoring of the PDCCH by the UE.

According to various embodiments of the present disclosure, the power saving operation may include an operation by a hybrid automatic repeat request (HARQ) process corresponding to a TB scheduled by downlink control information (DCI) including the control information of a frame-level.

According to various embodiments of the present disclosure, when the same control information of a frame-level is transmitted by the BS to the UE multiple times by multiple DCIs, the power saving operation may include an operation by a HARQ process corresponding to a TB scheduled by the last transmitted DCI.

According to various embodiments of the present disclosure, there is provided a user equipment (UE) supporting extended reality (XR) in a wireless communication system. The UE includes a transceiver and at least one processor, and the at least one processor may be configured to perform the operation method of the UE based on FIG. 16.

According to various embodiments of the present disclosure, there are provided there is provided a device controlling a user equipment (UE) supporting extended reality (XR) in a wireless communication system. The device includes at least one processor and at least one memory operably connected to the at least one processor. The at least one memory may be configured to store instructions performing the operation method of the UE based on FIG. 16 based on being executed by the at least one processor.

According to various embodiments of the present disclosure, there are provided one or more non-transitory computer readable mediums storing one or more instructions. The one or more instructions perform operations based on being executed by one or more processors, and the operations may include the operation method of the UE based on FIG. 16.

[Description Related to Claims on BS]

Below, the above-described embodiments are described in detail from a perspective of an operation of a base station with reference to FIG. 17. Methods to be described below are merely distinguished for convenience of explanation. Thus, as long as the methods are not mutually exclusive, it is obvious that partial configuration of any method can be substituted or combined with partial configuration of another method.

FIG. 17 illustrates an operation method of a base station in a wireless communication system according to an embodiment of the present disclosure.

According to various embodiments of the present disclosure, there is provided a method performed by a base station (BS) in a wireless communication system.

In step S1710, the BS generates control information related to a power saving operation for a user equipment (UE) supporting extended reality (XR). According to various embodiments of the present disclosure, when a plurality of transport blocks (TBs) constituting a traffic is mapped to one frame, the BS generates the control information related to the power saving operation for the UE supporting XR based on delay related information of the traffic.

In step S1720, the BS transmits, to the UE, the control information related to the power saving operation. According to various embodiments of the present disclosure, the BS transmits the control information to the UE on a per frame basis.

According to various embodiments of the present disclosure, the power saving operation within the control information may be configured per frame or per hybrid automatic repeat request (HARQ) process constituting the frame.

According to various embodiments of the present disclosure, the control information may include information for a XR-retransmission (reTx) timer of the UE. If the XR-reTx timer expires, the power saving operation may include an operation of stopping a monitoring of a physical downlink control channel (PDCCH) by the UE.

According to various embodiments of the present disclosure, the XR-reTx timer may start after the BS receives, from the UE, an acknowledgement (ACK) response or a negative acknowledgement (NACK) response to a physical downlink shared channel (PDSCH).

According to various embodiments of the present disclosure, the XR-reTx timer may start at a first symbol after the BS receives, from the UE, the ACK response or the NACK response to the PDSCH.

According to various embodiments of the present disclosure, the XR-reTx timer may start after the control information is transmitted to the UE from the BS.

According to various embodiments of the present disclosure, if the XR-reTx timer for a first TB within the frame or a last TB within the frame expires, the power saving operation may include an operation of stopping the monitoring of the PDCCH by the UE.

According to various embodiments of the present disclosure, the power saving operation may include an operation by a hybrid automatic repeat request (HARQ) process corresponding to a TB scheduled by downlink control information (DCI) including the control information of a frame-level.

According to various embodiments of the present disclosure, when the same control information of a frame-level is transmitted by the BS to the UE multiple times by multiple DCIs, the power saving operation may include an operation by a HARQ process corresponding to a TB scheduled by the last transmitted DCI.

According to various embodiments of the present disclosure, there is provided a base station (BS) in a wireless communication system. The base station includes a transceiver and at least one processor, and the at least one processor may be configured to perform the operation method of the base station based on FIG. 17.

According to various embodiments of the present disclosure, there are provided there is provided a device controlling a base station (BS) in a wireless communication system. The device includes at least one processor and at least one memory operably connected to the at least one processor. The at least one memory may be configured to store instructions performing the operation method of the base station based on FIG. 17 based on being executed by the at least one processor.

According to various embodiments of the present disclosure, there are provided one or more non-transitory computer readable mediums storing one or more instructions. The one or more instructions perform operations based on being executed by one or more processors, and the operations may include the operation method of the base station based on FIG. 17.

Below, devices to which various embodiments of the present disclosure are applicable are described.

Although not limited thereto, various descriptions, functions, procedures, proposals, methods, and/or operation flowcharts described in the present disclosure can be applied to various fields requiring wireless communication/connection between devices.

Below, the devices are described in more detail with reference to drawings. In the following drawings/descriptions, the same reference numerals may denote the same or corresponding hardware blocks, software blocks, or functional blocks, unless otherwise stated.

Device Used in Wireless Communication System

Example of Communication System to which the Present Disclosure is Applied

Although not limited thereto, various proposals of the present disclosure described above can be applied to various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system based on various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communications/connections 150*a* and 150*b* may be made between the wireless devices 100*a* to 100*f* and the base station 200. The wireless communication/connection may be made through various wireless access technologies (e.g., 5G NR) such as uplink/downlink communication 150*a* and sidelink communication 150*b* (or D2D communication). The wireless device and the base station/the wireless device may transmit/receive radio signals to/from each other through wireless communications/connections 150*a* and 150*b*. For example, the wireless communications/connections 150*a* and 150*b* may transmit/receive signals on various physical channels. To this end, based on various proposals of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signals may be performed.

Example of Wireless Device to which the Present Disclosure is Applied

FIG. 19 illustrates an example of a wireless device applied to various embodiments of the present disclosure.

Referring to FIG. 19, a first wireless device 100 and a second wireless device 200 may transmit and receive radio signals through various wireless access technologies (e.g., LTE and NR). {The first wireless device 100 and the second wireless device 200} may correspond to {the wireless device 100*x* and the base station 200} and/or {the wireless device 100*x* and the wireless device 100*x*} of FIG. 18.

The first wireless device 100 may include one or more processors 102 and one or more memories 104 and may further include one or more transceivers 106 and/or one or more antennas 108. The processor 102 may control the memory 104 and/or the transceiver 106 and may be configured to implement functions, procedures and/or methods described/proposed above. For example, the processor 102 may process information within the memory 104 to generate first information/signal, and then transmit a radio signal including the first information/signal through the transceiver 106. Further, the processor 102 may receive a radio signal including second information/signal through the transceiver 106, and then store in the memory 104 information obtained from signal processing of the second information/signal. The memory 104 may be connected to the processor 102 and store various information related to an operation of the processor 102. For example, the memory 104 may store software codes including instructions for performing all or some of processes controlled by the processor 102 or performing procedures and/or methods described/proposed above. The processor 102 and the memory 104 may be a part of a communication modem/circuit/chip designed to implement the wireless communication technology (e.g., LTE and NR). The transceiver 106 may be connected to the processor 102 and may transmit and/or receive the radio signals via one or more antennas 108. The transceiver 106 may include a transmitter and/or a receiver. The transceiver 106 may be used interchangeably with a radio frequency (RF) unit. In various embodiments of the present disclosure, the wireless device may mean the communication modem/circuit/chip.

The second wireless device 200 may include one or more processors 202 and one or more memories 204 and may further include one or more transceivers 206 and/or one or more antennas 208. The processor 202 may control the memory 204 and/or the transceiver 206 and may be configured to implement functions, procedures, and/or methods described/proposed above. For example, the processor 202 may process information within the memory 204 to generate third information/signal and then transmit a radio signal including the third information/signal through the transceiver 206. Further, the processor 202 may receive a radio signal including fourth information/signal through the transceiver 206 and then store in the memory 204 information obtained from signal processing of the fourth information/signal. The memory 204 may be connected to the processor 202 and store various information related to an operation of the processor 202. For example, the memory 204 may store software codes including instructions for performing all or some of processes controlled by the processor 202 or performing procedures and/or methods described/proposed above. The processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver, and the transceiver 206 may be used interchangeably with the RF unit. In various embodiments of the present disclosure, the wireless device may mean the communication modem/circuit/chip.

Hardware elements of the wireless devices 100 and 200 are described in more detail below. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) based on the functions, procedures, proposals and/or methods described in the present disclosure. One or more processors 102 and 202 may generate a message, control information, data, or information based on the functions, procedures, proposals and/or methods described in the present disclosure. One or more processors 102 and 202 may generate a signal (e.g., a baseband signal) including the PDU, the SDU, the message, the control information, the data, or the information based on the functions, procedures, proposals and/or methods described in the present disclosure, and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information based on the functions, procedures, proposals, and/or methods described in the present disclosure.

One or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The functions, procedures, proposals and/or methods described in the present disclosure may be implemented using firmware or software, and the firmware or software may be implemented to include modules, procedures, functions, and the like. Firmware or software configured to perform the functions, procedures, proposals, and/or methods described in the present disclosure may be included in one or more processors 102 and 202 or stored in one or more memories 104 and 204 and may be executed by one or more processors 102 and 202. The functions, procedures, proposals, and/or methods described in the present disclosure may be implemented using firmware or software in the form of codes, instructions and/or a set form of instructions.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit to which the Present Disclosure is Applied

FIG. 20 illustrates a signal processing circuit for a transmission signal based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. X2. For example, the wireless devices (e.g., 100 and 200 of FIG. X1) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Utilization Example of Wireless Device to which the Present Disclosure is Applied FIG. 21 illustrates another example of a wireless device based on an embodiment of the present disclosure. The wireless device may be implemented in various forms based on a use-case/service (refer to FIG. 18, FIGS. 22-29).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place based on a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

FIG. 22 illustrates a mobile device based on an embodiment of the present disclosure. The hand-held device may include a smartphone, a smartpad, a wearable device (e.g., a smartwatch or a smartglasses), or a portable computer (e.g., a notebook). The mobile device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of Mobile Device to which the Present Disclosure is Applied

FIG. 22 illustrates a mobile device based on an embodiment of the present disclosure. The hand-held device may include a smartphone, a smartpad, a wearable device (e.g., a smartwatch or a smartglasses), or a portable computer (e.g., a notebook). The mobile device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of Vehicle or Autonomous Vehicle to which the Present Disclosure is Applied FIG. 23 illustrates a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Example of AR/VR and Vehicle to which the Present Disclosure is Applied

FIG. 24 illustrates an example of a vehicle applied to various embodiments of the present disclosure. The vehicle may be implemented as a transport means, a train, an aerial vehicle, a ship, etc.

Referring to FIG. 24, a vehicle 100 may include a communication unit 110, a control unit 120, a memory unit 130, an I/O unit 140*a*, and a positioning unit 140*b*. The blocks 110 to 130/140*a* and 140*b* correspond to blocks 110 to 130/140 of FIG. 21, respectively.

The communication unit 110 may transmit and receive signals (e.g., data and control signals) to and from external devices such as other vehicles or base stations. The control unit 120 may perform various operations by controlling components of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire location information of the vehicle 100. The location information may include absolute location information of the vehicle 100, location information of the vehicle 100 within a traveling lane, acceleration information, and location information of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain vehicle location information through the GPS and the various sensors and store the obtained information in the memory unit 130. The control unit 120 may generate a virtual object based on the map information, the traffic information, and the vehicle location information, and the I/O unit 140*a* may display the generated virtual object on a window in the vehicle (1410 and 1420). The control unit 120 may determine whether the vehicle 100 normally drives within a traveling lane, based on the vehicle location information. If the vehicle 100 abnormally exits from the traveling lane, the control unit 120 may display a warning on the window in the vehicle through the I/O unit 140*a*. In addition, the control unit 120 may broadcast a warning message about driving abnormity to neighboring vehicles through the communication unit 110. According to situation, the control unit 120 may transmit the location information of the vehicle and the information about driving/vehicle abnormality to related organizations through the communication unit 110.

Example of XR Device to which the Present Disclosure is Applied

FIG. 25 illustrates an example of a XR device applied to various embodiments of the present disclosure. The XR device may be implemented as an HMD, a head-up display (HUD) mounted in a vehicle, a television, a smartphone, a computer, a wearable device, a home appliance, a digital signage, a vehicle, a robot, etc.

Referring to FIG. 25, an XR device 100*a* may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 21, respectively.

The communication unit 110 may transmit and receive signals (e.g., media data, control signal, etc.) to and from external devices such as other wireless devices, handheld devices, or media servers. The media data may include video, images, sound, etc. The control unit 120 may control components of the XR device 100*a* to perform various operations. For example, the control unit 120 may be configured to control and/or perform procedures such as video/image acquisition, (video/image) encoding, and metadata generation and processing. The memory unit 120 may store data/parameters/programs/codes/commands required to drive the XR device 100*a*/generate an XR object. The I/O unit 140*a* may obtain control information, data, etc. from the outside and output the generated XR object. The I/O unit

140*a* may include a camera, a microphone, a user input unit, a display, a speaker, and/or a haptic module. The sensor unit 140*b* may obtain a state, surrounding environment information, user information, etc. of the XR device 100*a*. The sensor 140*b* may include a proximity sensor, an illumination sensor, an acceleration sensor, a magnetic sensor, a gyro sensor, an inertial sensor, an RGB sensor, an IR sensor, a fingerprint scan sensor, an ultrasonic sensor, a light sensor, a microphone, and/or a radar. The power supply unit 140*c* may supply power to the XR device 100*a* and include a wired/wireless charging circuit, a battery, etc.

For example, the memory unit 130 of the XR device 100*a* may include information (e.g., data) required to generate the XR object (e.g., an AR/VR/MR object). The I/O unit 140*a* may obtain, from a user, a command for manipulating the XR device 100*a*, and the control unit 120 may drive the XR device 100*a* based on a driving command of the user. For example, if the user desires to watch a film, news, etc. through the XR device 100*a*, the control unit 120 may transmit content request information to another device (e.g., a handheld device 100*b*) or a media server through the communication unit 110. The communication unit 110 may download/stream content such as films and news from another device (e.g., the handheld device 100*b*) or the media server to the memory unit 130. The control unit 120 may control and/or perform procedures, such as video/image acquisition, (video/image) encoding, and metadata generation/processing, for the content and generate/output the XR object based on information about a surrounding space or a real object obtained through the I/O unit 140*a*/sensor unit 140*b*.

The XR device 100*a* may be wirelessly connected to the handheld device 100*b* through the communication unit 110, and the operation of the XR device 100*a* may be controlled by the handheld device 100*b*. For example, the handheld device 100*b* may operate as a controller of the XR device 100*a*. To this end, the XR device 100*a* may obtain 3D location information of the handheld device 100*b* and generate and output an XR object corresponding to the handheld device 100*b*.

Example of Robot to which the Present Disclosure is Applied

FIG. 26 illustrates an example of a robot applied to various embodiments of the present disclosure. The robot may be categorized into an industrial robot, a medical robot, a household robot, a military robot, etc., based on a used purpose or field.

Referring to FIG. 26, a robot 100 may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 21, respectively.

The communication unit 110 may transmit and receive signals (e.g., driving information and control signals) to and from external devices such as other wireless devices, other robots, or control servers. The control unit 120 may perform various operations by controlling components of the robot 100. The memory unit 130 may store data/parameters/programs/code/commands for supporting various functions of the robot 100. The I/O unit 140*a* may obtain information from the outside of the robot 100 and output information to the outside of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may allow the robot 100 to travel on the road or to fly. The driving unit 140*c* may include an actuator, a motor, a wheel, a brake, a propeller, etc.

Example of AI Device to which the Present Disclosure is Applied

FIG. 27 illustrates an example of an AI device applied to various embodiments of the present disclosure. The AI device may be implemented as a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 27, an AI device 100 may include a communication unit 110, a control unit 120, a memory unit 130, an input unit 140*a*, an out unit 140*b*, a learning processor unit 140*c*, and a sensor unit 140*d*. The blocks 110 to 130/140*a* to 140*d* correspond to the blocks 110 to 130/140 of FIG. 21, respectively.

The communication unit 110 may transmit and receive wired/radio signals (e.g., sensor information, user input, learning models, or control signals) to and from external devices such as other AI devices (e.g., 100*x*, 200, or 400 of FIG. 18) or an AI server (e.g., 400 of FIG. 18) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling components of the AI device 100. For example, the control unit 120 may request, search, receive, or use data of the learning processor unit 140*c* or the memory unit 130 and control the components of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 18). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 18). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

When embodiments are implemented by firmware or software, one embodiment of the present disclosure can be implemented by modules, procedures, functions, etc. performing the functions or operations described above. Software code can be stored in a memory unit and can be driven by a processor. The memory unit is provided inside or outside the processor and can exchange data with the processor by various well-known means.

Although the present disclosure has described embodiments of the present disclosure using the LTE system, the LTE-A system, and the NR system, this is merely an example, and embodiments of the present disclosure can be applied to any communication system corresponding to the above definition.

In the present disclosure, specific operations described to be performed by the base station may be performed by an upper node of the base station in some cases. That is, in a network consisting of a plurality of network nodes including the base station, it is obvious that various operations performed for communication with the UE can be performed by the base station or network nodes other than the base station. The base station (BS) may be replaced with terms such as a fixed station, Node B, eNode B (eNB), and an access point, and the name of the base station can be used as a comprehensive term including a remote radio head (RRH), eNB, a transmission point (TP), a reception point (RP), a relay, etc. It is apparent to those skilled in the art that the present disclosure can be embodied in other specific forms within the scope without departing from features of the present disclosure. Accordingly, the above detailed description should not be interpreted as limiting in all aspects and should be interpreted as illustrative. The scope of the present disclosure should be determined by the rational interpretation of the appended claims, and all modifications within an equivalent scope of the present disclosure are included in the scope of the present disclosure.

Claims disclosed in the present disclosure may be combined in various ways. For example, technical features of method claims of the present disclosure may be combined and implemented as a device, and technical features of device claims of the present disclosure may be combined and implemented as a method. Further, the technical features of method claims and the technical features of device claims in the present disclosure may be combined and implemented as a device, and the technical features of method claims and the technical features of device claims in the present disclosure may be combined and implemented as a method.

INDUSTRIAL APPLICABILITY

The present disclosure relates to a wireless communication system, and more particularly to a method and device of supporting power saving based on XR traffic characteristics in a wireless communication system.

The invention claimed is:

1. A method performed by a base station (BS) in a wireless communication system, the method comprising:

based on a plurality of transport blocks (TBs) constituting a traffic being mapped to one frame, generating control information related to a power saving operation for a user equipment (UE) supporting extended reality (XR) based on delay related information of the traffic; and transmitting the control information to the UE on a per frame basis, wherein the control information includes information on an order of the plurality of TBs within the frame, information on a first TB within the frame, and information on a last TB within the frame, wherein the control information further includes information for a XR-retransmission (reTx) timer of the UE, and wherein the XR-reTx timer starts after the BS receives, from the UE, an acknowledgement (ACK) response or a negative acknowledgement (NACK) response to a physical downlink shared channel (PDSCH).

2. The method of claim 1, wherein the power saving operation within the control information is configured per frame or per hybrid automatic repeat request (HARQ) process constituting the frame.

3. The method of claim 1, wherein, based on the XR-reTx timer expiring, the power saving operation includes an operation of stopping a monitoring of a physical downlink control channel (PDCCH) by the UE.

4. The method of claim 3, wherein the XR-reTx timer starts after the control information is transmitted to the UE from the BS.

5. The method of claim 3, wherein, based on the XR-reTx timer for the first TB within the frame or the last TB within the frame expiring, the power saving operation includes the operation of stopping the monitoring of the PDCCH by the UE.

6. The method of claim 1, wherein the power saving operation includes an operation by a hybrid automatic repeat request (HARQ) process related to a TB scheduled by downlink control information (DCI) including the control information of a frame-level.

7. The method of claim 6, wherein, based on the same control information of the frame-level being transmitted by the BS to the UE multiple times by multiple DCIs, the power saving operation includes an operation by the HARQ process related to a TB scheduled by a last transmitted DCI.

8. A base station (BS) in a wireless communication system, the BS comprising:

a transceiver; and at least one processor, wherein the at least one processor is configured to:

based on a plurality of transport blocks (TBs) constituting a traffic being mapped to one frame, generate control information related to a power saving operation for a user equipment (UE) supporting extended reality (XR) based on delay related information of the traffic; and transmit the control information to the UE on a per frame basis, wherein the control information includes information on an order of the plurality of TBs within the frame, information on a first TB within the frame, and information on a last TB within the frame, wherein the control information further includes information for a XR-retransmission (reTx) timer of the UE, and wherein the XR-reTx timer starts after the BS receives, from the UE, an acknowledgement (ACK) response or a negative acknowledgement (NACK) response to a physical downlink shared channel (PDSCH).

9. The BS of claim 8, wherein the power saving operation within the control information is configured per frame or per hybrid automatic repeat request (HARQ) process constituting the frame.

10. The BS of claim 8, wherein, based on the XR-reTx timer expiring, the power saving operation includes an operation of stopping a monitoring of a physical downlink control channel (PDCCH) by the UE.

11. The BS of claim 8, wherein the XR-reTx timer starts at a first symbol after the BS receives, from the UE, the ACK response or the NACK response to the PDSCH.

12. The BS of claim 10, wherein the XR-reTx timer starts after the control information is transmitted to the UE from the BS.

13. The BS of claim 10, wherein, based on the XR-reTx timer for the first TB within the frame or the last TB within the frame expiring, the power saving operation includes the operation of stopping the monitoring of the PDCCH by the UE.

14. The BS of claim 8, wherein the power saving operation includes an operation by a hybrid automatic repeat request (HARQ) process related to a TB scheduled by downlink control information (DCI) including the control information of a frame-level.

15. The BS of claim 14, wherein, based on the same control information of the frame-level being transmitted by the BS to the UE multiple times by multiple DCIs, the power saving operation includes an operation by the HARQ process related to a TB scheduled by a last transmitted DCI.

16. A device controlling a base station (BS) in a wireless communication system, the device comprising:

at least one processor; and at least one memory operably connected to the at least one processor, wherein the at least one memory is configured to store instructions performing operations based on being executed by the at least one processor, wherein the operations comprise:

based on a plurality of transport blocks (TBs) constituting a traffic being mapped to one frame, generating control information related to a power saving operation for a user equipment (UE) supporting extended reality (XR) based on delay related information of the traffic; and transmitting the control information to the UE on a per frame basis, wherein the control information includes information on an order of the plurality of TBs within the frame, information on a first TB within the frame, and information on a last TB within the frame, wherein the control information further includes information for a XR-retransmission (reTx) timer of the UE, and wherein the XR-reTx timer starts after the BS receives, from the UE, an acknowledgement (ACK) response or a negative acknowledgement (NACK) response to a physical downlink shared channel (PDSCH).

* * * * *